US009682320B2

(12) United States Patent
Mao et al.

(10) Patent No.: US 9,682,320 B2
(45) Date of Patent: *Jun. 20, 2017

(54) INERTIALLY TRACKABLE HAND-HELD CONTROLLER

(71) Applicant: Sony Computer Entertainment Inc., Tokyo (JP)

(72) Inventors: Xiaodong Mao, Foster City, CA (US); Richard L. Marks, Foster City, CA (US); Gary M. Zalewski, Oakland, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 169 days.

This patent is subject to a terminal disclaimer.

(21) Appl. No.: 14/448,622

(22) Filed: Jul. 31, 2014

(65) Prior Publication Data

US 2014/0342827 A1 Nov. 20, 2014

Related U.S. Application Data

(63) Continuation of application No. 11/382,035, filed on May 6, 2006, now Pat. No. 8,797,260, which is a
(Continued)

(51) Int. Cl.
*G09G 5/00* (2006.01)
*A63F 13/428* (2014.01)
(Continued)

(52) U.S. Cl.
CPC .......... *A63F 13/428* (2014.09); *A63F 13/06* (2013.01); *A63F 13/211* (2014.09); *A63F 13/213* (2014.09);
(Continued)

(58) Field of Classification Search
CPC ........ A63F 2300/105; A63F 2300/6045; A63F 2300/1087; A63F 2300/1081; A63F 13/428; A63F 13/221; A63F 13/06; A63F 13/213

See application file for complete search history.

(56) References Cited

U.S. PATENT DOCUMENTS 3,943,277 A 3/1976 Everly et al.
4,263,504 A 4/1981 Thomas
(Continued)

FOREIGN PATENT DOCUMENTS

EP 0353200 A 1/1990
EP 0613294 A 8/1994
(Continued)

OTHER PUBLICATIONS

US 2002/0018582 A1, 02/2002, Hagiwara et al. (withdrawn)
(Continued)

*Primary Examiner* — Andrew Sasinowski
*Assistant Examiner* — Brent D Castiaux
(74) *Attorney, Agent, or Firm* — Joshua D. Isenberg; JDI Patent

(57) ABSTRACT

A game controller includes an image capture unit; a body; at least one input device assembled with the body, the input device manipulable by a user to register an input from the user; an inertial sensor operable to produce information for quantifying a movement of said body through space; and at least one light source assembled with the body; and a processor coupled to the image capture unit and the inertial sensor. The processor is configured to track the body by analyzing a signal from the inertial sensor and analyzing an image of the light source from the image capture unit. The
(Continued)

processor is configured to establish a gearing between movement of the body and actions to be applied by a computer program.

35 Claims, 11 Drawing Sheets

Related U.S. Application Data continuation-in-part of application No. 11/381,721, filed on May 4, 2006, now Pat. No. 8,947,347, and a continuation-in-part of application No. 11/381,724, filed on May 4, 2006, now Pat. No. 8,073,157, and a continuation-in-part of application No. 11/381,725, filed on May 4, 2006, now Pat. No. 7,783,061, and a continuation-in-part of application No. 11/381,727, filed on May 4, 2006, now Pat. No. 7,697,700, and a continuation-in-part of application No. 11/381,728, filed on May 4, 2006, now Pat. No. 7,545,926, and a continuation-in-part of application No. 11/381,729, filed on May 4, 2006, now Pat. No. 7,809,145, and a continuation-in-part of application No. 11/301,673, filed on Dec. 12, 2005, now Pat. No. 7,646,372, and a continuation-in-part of application No. 10/820,469, filed on Apr. 7, 2004, now Pat. No. 7,970,147, and a continuation-in-part of application No. 10/759,782, filed on Jan. 16, 2004, now Pat. No. 7,623,115, and a continuation-in-part of application No. 10/663,236, filed on Sep. 15, 2003, now Pat. No. 7,883,415, and a continuation-in-part of application No. 10/650,409, filed on Aug. 27, 2003, now Pat. No. 7,613,310, and a continuation-in-part of application No. 10/207,677, filed on Jul. 27, 2002, now Pat. No. 7,102,615, said application No. 11/381,725 is a continuation-in-part of application No. 10/820,469, and a continuation-in-part of application No. 10/759,782, which is a continuation-in-part of application No. 10/207,677, said application No. 11/381,724 is a continuation-in-part of application No. 10/820,469, and a continuation-in-part of application No. 10/759,782, and a continuation-in-part of application No. 10/650,409, said application No. 11/381,721 is a continuation-in-part of application No. 10/820,469, and a continuation-in-part of application No. 10/759,782, and a continuation-in-part of application No. 10/650,409, said application No. 11/301,673 is a continuation-in-part of application No. 10/759,782, and a continuation-in-part of application No. 10/663,236, said application No. 10/759,782 is a continuation-in-part of application No. 10/207,677.

(60) Provisional application No. 60/718,145, filed on Sep. 15, 2005, provisional application No. 60/678,413, filed on May 5, 2005.

(51) Int. Cl.
    *A63F 13/211*     (2014.01)
    *A63F 13/20*     (2014.01)
    *A63F 13/213*     (2014.01)

(52) U.S. Cl.
    CPC . *A63F 2300/105* (2013.01); *A63F 2300/1081* (2013.01); *A63F 2300/1087* (2013.01); *A63F 2300/6045* (2013.01)

(56) References Cited

U.S. PATENT DOCUMENTS

| | | |
|---|---|---|
| 4,313,227 A | 1/1982 | Eder |
| 4,458,536 A | 7/1984 | Ahn et al. |
| 4,558,864 A | 12/1985 | Medwedeff |
| 4,565,999 A | 1/1986 | King et al. |
| 4,787,051 A | 11/1988 | Olson |
| 4,802,227 A | 1/1989 | Elko et al. |
| 4,811,243 A | 3/1989 | Racine |
| 4,823,001 A | 4/1989 | Kobayashi et al. |
| 4,843,568 A | 6/1989 | Krueger et al. |
| 4,872,342 A | 10/1989 | Hanson et al. |
| 4,963,858 A | 10/1990 | Chien |
| 5,034,986 A | 7/1991 | Karmann et al. |
| 5,055,840 A | 10/1991 | Bartlett |
| 5,111,401 A | 5/1992 | Everett, Jr. et al. |
| 5,128,671 A | 7/1992 | Thomas, Jr. |
| 5,144,594 A | 9/1992 | Gilchrist |
| 5,195,179 A | 3/1993 | Tokunaga |
| 5,214,615 A | 5/1993 | Bauer |
| 5,227,985 A | 7/1993 | DeMenthon |
| 5,260,556 A | 11/1993 | Lake et al. |
| 5,262,777 A | 11/1993 | Low et al. |
| 5,296,871 A | 3/1994 | Paley |
| 5,297,061 A | 3/1994 | Dementhon et al. |
| 5,335,011 A | 8/1994 | Addeo et al. |
| 5,394,168 A | 2/1995 | Smith et al. |
| 5,426,450 A | 6/1995 | Drumm |
| 5,435,554 A | 7/1995 | Lipson |
| 5,440,326 A | 8/1995 | Quinn |
| 5,453,758 A | 9/1995 | Sato |
| 5,455,685 A | 10/1995 | Mori |
| 5,473,701 A | 12/1995 | Cezanne et al. |
| 5,485,273 A | 1/1996 | Mark et al. |
| 5,517,333 A | 5/1996 | Tamura et al. |
| 5,528,265 A | 6/1996 | Harrison |
| 5,534,917 A | 7/1996 | MacDougall |
| 5,543,818 A | 8/1996 | Scott |
| 5,554,980 A | 9/1996 | Hashimoto et al. |
| 5,557,684 A | 9/1996 | Wang et al. |
| 5,563,988 A | 10/1996 | Maes et al. |
| 5,568,928 A | 10/1996 | Munson et al. |
| 5,581,276 A | 12/1996 | Cipolla et al. |
| 5,583,478 A | 12/1996 | Renzi |
| 5,586,231 A | 12/1996 | Florent et al. |
| 5,602,566 A | 2/1997 | Motosyuku et al. |
| 5,611,000 A | 3/1997 | Szeliski et al. |
| 5,611,731 A | 3/1997 | Bouton et al. |
| 5,616,078 A | 4/1997 | Oh |
| 5,626,140 A | 5/1997 | Feldman et al. |
| 5,638,228 A | 6/1997 | Thomas, III |
| 5,649,021 A | 7/1997 | Matey et al. |
| 5,670,774 A * | 9/1997 | Hill .................... G01S 3/784 126/573 |
| 5,675,825 A | 10/1997 | Dreyer et al. |
| 5,675,828 A | 10/1997 | Stoel et al. |
| 5,677,710 A | 10/1997 | Thompson-Rohrlich |
| 5,706,364 A | 1/1998 | Kopec et al. |
| 5,768,415 A | 6/1998 | Jagadish et al. |
| 5,796,354 A | 8/1998 | Cartabiano et al. |
| 5,818,424 A | 10/1998 | Korth |
| 5,831,164 A | 11/1998 | Reddi et al. |
| 5,846,086 A | 12/1998 | Bizzi et al. |
| 5,850,222 A | 12/1998 | Cone |
| 5,850,473 A | 12/1998 | Andersson |
| 5,861,910 A | 1/1999 | Mcgarry et al. |
| 5,870,100 A | 2/1999 | Defreitas |
| 5,878,367 A | 3/1999 | Lee et al. |
| 5,883,616 A | 3/1999 | Koizumi et al. |
| 5,889,672 A | 3/1999 | Schuler et al. |
| 5,900,863 A | 5/1999 | Numazaki |
| 5,913,727 A | 6/1999 | Ahdoot |
| 5,914,723 A | 6/1999 | Gajewska |
| 5,917,493 A | 6/1999 | Tan et al. |
| 5,917,936 A | 6/1999 | Katto |
| 5,923,306 A | 7/1999 | Smith et al. |
| 5,923,318 A | 7/1999 | Zhai et al. |

(56) References Cited

U.S. PATENT DOCUMENTS

| | | |
|---|---|---|
| 5,929,444 A | 7/1999 | Leichner |
| 5,930,383 A | 7/1999 | Netzer |
| 5,930,741 A | 7/1999 | Kramer |
| 5,937,081 A | 8/1999 | O'Brill et al. |
| 5,959,596 A | 9/1999 | Mccarten et al. |
| 5,963,250 A | 10/1999 | Parker et al. |
| 5,993,314 A | 11/1999 | Dannenberg et al. |
| 6,009,210 A | 12/1999 | Kang |
| 6,014,167 A | 1/2000 | Suito et al. |
| 6,021,219 A | 2/2000 | Andersson et al. |
| 6,022,274 A | 2/2000 | Takeda et al. |
| 6,031,545 A | 2/2000 | Ellenby et al. |
| 6,031,934 A | 2/2000 | Ahmad et al. |
| 6,037,942 A | 3/2000 | Millington |
| 6,044,181 A | 3/2000 | Szeliski et al. |
| 6,049,619 A | 4/2000 | Anandan et al. |
| 6,056,640 A | 5/2000 | Schaaij |
| 6,057,909 A | 5/2000 | Yahav et al. |
| 6,061,055 A | 5/2000 | Marks |
| 6,069,594 A | 5/2000 | Barnes et al. |
| 6,072,494 A | 6/2000 | Nguyen |
| 6,075,895 A | 6/2000 | Qiao et al. |
| 6,078,789 A | 6/2000 | Bodenmann et al. |
| 6,091,905 A | 7/2000 | Yahav et al. |
| 6,094,625 A | 7/2000 | Ralston |
| 6,097,369 A | 8/2000 | Wambach |
| 6,100,517 A | 8/2000 | Yahav et al. |
| 6,100,895 A | 8/2000 | Miura et al. |
| 6,101,289 A | 8/2000 | Kellner |
| 6,115,052 A | 9/2000 | Freeman et al. |
| 6,134,346 A | 10/2000 | Berman et al. |
| 6,144,367 A | 11/2000 | Berstis |
| 6,151,009 A | 11/2000 | Kanade et al. |
| 6,157,368 A | 12/2000 | Fager |
| 6,157,403 A | 12/2000 | Nagata |
| 6,160,540 A | 12/2000 | Fishkin et al. |
| 6,166,744 A | 12/2000 | Jaszlics et al. |
| 6,173,059 B1 | 1/2001 | Huang et al. |
| 6,175,343 B1 | 1/2001 | Mitchell et al. |
| 6,176,837 B1 * | 1/2001 | Foxlin ............... G01C 21/165 128/897 |
| 6,184,847 B1 | 2/2001 | Fateh et al. |
| 6,184,863 B1 | 2/2001 | Sibert et al. |
| 6,191,773 B1 | 2/2001 | Maruno et al. |
| 6,195,104 B1 | 2/2001 | Lyons |
| 6,215,898 B1 | 4/2001 | Woodfill et al. |
| 6,243,074 B1 | 6/2001 | Fishkin et al. |
| 6,243,491 B1 | 6/2001 | Andersson |
| 6,275,213 B1 | 8/2001 | Tremblay et al. |
| 6,281,930 B1 | 8/2001 | Parker et al. |
| 6,282,362 B1 | 8/2001 | Murphy et al. |
| 6,295,064 B1 | 9/2001 | Yamaguchi |
| 6,297,838 B1 | 10/2001 | Chang et al. |
| 6,304,267 B1 | 10/2001 | Sata |
| 6,307,549 B1 | 10/2001 | King et al. |
| 6,307,568 B1 | 10/2001 | Rom |
| 6,323,839 B1 | 11/2001 | Fukuda et al. |
| 6,323,942 B1 | 11/2001 | Bamji |
| 6,326,901 B1 | 12/2001 | Gonzales |
| 6,327,073 B1 | 12/2001 | Yahav et al. |
| 6,331,911 B1 | 12/2001 | Manassen et al. |
| 6,346,929 B1 | 2/2002 | Fukushima et al. |
| 6,351,661 B1 | 2/2002 | Cosman |
| 6,371,849 B1 | 4/2002 | Togami |
| 6,375,572 B1 | 4/2002 | Masuyama et al. |
| 6,392,644 B1 | 5/2002 | Miyata et al. |
| 6,393,142 B1 | 5/2002 | Swain et al. |
| 6,394,897 B1 | 5/2002 | Togami |
| 6,400,374 B2 | 6/2002 | Lanier |
| 6,409,602 B1 | 6/2002 | Wiltshire et al. |
| 6,411,392 B1 | 6/2002 | Bender et al. |
| 6,411,744 B1 | 6/2002 | Edwards |
| 6,417,836 B1 | 7/2002 | Kumar et al. |
| 6,441,825 B1 | 8/2002 | Peters |
| 6,473,516 B1 | 10/2002 | Kawaguchi et al. |
| 6,489,948 B1 | 12/2002 | Lau |
| 6,498,860 B1 | 12/2002 | Sasaki et al. |
| 6,504,535 B1 | 1/2003 | Edmark |
| 6,513,160 B2 | 1/2003 | Dureau |
| 6,516,466 B1 | 2/2003 | Jackson |
| 6,533,420 B1 | 3/2003 | Eichenlaub |
| 6,542,927 B2 | 4/2003 | Rhoads |
| 6,545,661 B1 | 4/2003 | Goschy et al. |
| 6,545,706 B1 | 4/2003 | Edwards et al. |
| 6,546,153 B1 | 4/2003 | Hoydal |
| 6,556,704 B1 | 4/2003 | Chen |
| 6,573,883 B1 | 6/2003 | Bartlett |
| 6,577,748 B2 | 6/2003 | Chang |
| 6,580,414 B1 | 6/2003 | Wergen et al. |
| 6,580,415 B1 | 6/2003 | Kato et al. |
| 6,587,573 B1 | 7/2003 | Stam et al. |
| 6,593,956 B1 | 7/2003 | Potts et al. |
| 6,595,642 B2 | 7/2003 | Wirth |
| 6,597,342 B1 | 7/2003 | Haruta |
| 6,611,141 B1 | 8/2003 | Schulz et al. |
| 6,621,938 B1 | 9/2003 | Tanaka et al. |
| 6,628,265 B2 | 9/2003 | Hwang |
| 6,661,914 B2 | 12/2003 | Dufour |
| 6,674,415 B2 | 1/2004 | Nakamura et al. |
| 6,676,522 B2 | 1/2004 | Rowe et al. |
| 6,677,967 B2 | 1/2004 | Sawano et al. |
| 6,677,987 B1 | 1/2004 | Girod |
| 6,681,629 B2 | 1/2004 | Foxlin et al. |
| 6,699,123 B2 | 3/2004 | Matsuura et al. |
| 6,709,108 B2 | 3/2004 | Levine et al. |
| 6,720,949 B1 | 4/2004 | Pryor et al. |
| 6,727,988 B2 | 4/2004 | Kim et al. |
| 6,729,731 B2 | 5/2004 | Gnanamgari et al. |
| 6,741,741 B2 | 5/2004 | Farrell |
| 6,746,124 B2 | 6/2004 | Fischer et al. |
| 6,749,510 B2 | 6/2004 | Giobbi |
| 6,751,338 B1 | 6/2004 | Wallack |
| 6,753,849 B1 | 6/2004 | Curran et al. |
| 6,757,068 B2 | 6/2004 | Foxlin |
| 6,767,282 B2 | 7/2004 | Matsuyama et al. |
| 6,769,769 B2 | 8/2004 | Podoleanu et al. |
| 6,772,057 B2 | 8/2004 | Breed et al. |
| 6,774,939 B1 | 8/2004 | Peng |
| 6,785,329 B2 | 8/2004 | Pan et al. |
| 6,789,967 B1 | 9/2004 | Forester |
| 6,791,531 B1 | 9/2004 | Johnston et al. |
| 6,795,068 B1 | 9/2004 | Marks |
| 6,809,776 B1 | 10/2004 | Simpson |
| 6,819,318 B1 | 11/2004 | Geng |
| 6,846,238 B2 | 1/2005 | Wells |
| 6,847,311 B2 | 1/2005 | Li |
| 6,863,609 B2 | 3/2005 | Okuda et al. |
| 6,881,147 B2 | 4/2005 | Nashi et al. |
| 6,884,171 B2 | 4/2005 | Eck et al. |
| 6,890,262 B2 | 5/2005 | Oishi et al. |
| 6,917,688 B2 | 7/2005 | Yu et al. |
| 6,919,824 B2 | 7/2005 | Lee |
| 6,924,787 B2 | 8/2005 | Kramer et al. |
| 6,928,180 B2 | 8/2005 | Stam et al. |
| 6,930,725 B1 | 8/2005 | Hayashi |
| 6,931,125 B2 | 8/2005 | Smallwood |
| 6,931,596 B2 | 8/2005 | Gutta et al. |
| 6,943,776 B2 | 9/2005 | Ehrenburg |
| 6,945,653 B2 | 9/2005 | Kobori et al. |
| 6,947,576 B2 | 9/2005 | Stam et al. |
| 6,951,515 B2 | 10/2005 | Ohshima et al. |
| 6,952,198 B2 | 10/2005 | Hansen |
| 6,965,362 B1 | 11/2005 | Ishizuka |
| 6,970,183 B1 | 11/2005 | Monroe |
| 6,990,639 B2 | 1/2006 | Wilson |
| 7,006,009 B2 | 2/2006 | Newman |
| 7,016,411 B2 | 3/2006 | Azuma et al. |
| 7,023,475 B2 | 4/2006 | Bean et al. |
| 7,038,661 B2 | 5/2006 | Wilson et al. |
| 7,039,199 B2 | 5/2006 | Rui |
| 7,039,253 B2 | 5/2006 | Matsuoka et al. |
| 7,042,440 B2 | 5/2006 | Pryor et al. |
| 7,043,056 B2 | 5/2006 | Edwards et al. |
| 7,054,452 B2 | 5/2006 | Ukita |

(56) References Cited

U.S. PATENT DOCUMENTS

| | | |
|---|---|---|
| 7,059,962 B2 | 6/2006 | Watashiba |
| 7,061,507 B1 | 6/2006 | Tuomi et al. |
| 7,071,914 B1 | 7/2006 | Marks |
| 7,082,578 B1 | 7/2006 | Fishkin et al. |
| 7,084,887 B1 | 8/2006 | Sato et al. |
| 7,090,352 B2 | 8/2006 | Kobori et al. |
| 7,098,891 B1 | 8/2006 | Pryor |
| 7,102,615 B2 | 9/2006 | Marks |
| 7,106,366 B2 | 9/2006 | Parker et al. |
| 7,113,166 B1 | 9/2006 | Rosenberg et al. |
| 7,116,330 B2 | 10/2006 | Marshall et al. |
| 7,116,342 B2 | 10/2006 | Dengler et al. |
| 7,121,946 B2 | 10/2006 | Paul et al. |
| 7,139,767 B1 | 11/2006 | Taylor et al. |
| 7,148,922 B2 | 12/2006 | Shimada |
| 7,158,118 B2 | 1/2007 | Liberty |
| 7,161,579 B2 | 1/2007 | Daniel |
| 7,161,634 B2 | 1/2007 | Long |
| 7,164,413 B2 | 1/2007 | Davis et al. |
| 7,180,502 B2 | 2/2007 | Marvit et al. |
| 7,183,929 B1 | 2/2007 | Antebi et al. |
| 7,212,308 B2 | 5/2007 | Morgan |
| 7,223,173 B2 | 5/2007 | Masuyama et al. |
| 7,224,384 B1 | 5/2007 | Iddan et al. |
| 7,227,526 B2 | 6/2007 | Hildreth et al. |
| 7,227,976 B1 | 6/2007 | Jung et al. |
| 7,233,316 B2 | 6/2007 | Smith et al. |
| 7,239,301 B2 | 7/2007 | Liberty et al. |
| 7,245,273 B2 | 7/2007 | Eberl et al. |
| 7,259,375 B2 | 8/2007 | Tichit et al. |
| 7,262,760 B2 | 8/2007 | Liberty |
| 7,263,462 B2 | 8/2007 | Funge et al. |
| 7,274,305 B1 | 9/2007 | Luttrell |
| 7,277,526 B2 | 10/2007 | Rifkin et al. |
| 7,283,679 B2 | 10/2007 | Okada et al. |
| 7,286,753 B2 | 10/2007 | Yamasaki |
| 7,296,007 B1 | 11/2007 | Funge et al. |
| 7,301,530 B2 | 11/2007 | Lee et al. |
| 7,305,114 B2 | 12/2007 | Wolff et al. |
| 7,345,670 B2 | 3/2008 | Armstrong |
| 7,346,387 B1 | 3/2008 | Wachter et al. |
| 7,352,359 B2 | 4/2008 | Zalewski et al. |
| 7,364,297 B2 | 4/2008 | Goldfain et al. |
| 7,373,242 B2 | 5/2008 | Yamane |
| 7,379,559 B2 | 5/2008 | Wallace et al. |
| 7,391,409 B2 | 6/2008 | Zalewski et al. |
| 7,401,920 B1 | 7/2008 | Kranz et al. |
| 7,414,596 B2 | 8/2008 | Satoh et al. |
| 7,414,611 B2 | 8/2008 | Liberty |
| 7,436,887 B2 | 10/2008 | Yeredor et al. |
| 7,446,650 B2 | 11/2008 | Scholfield et al. |
| 7,460,110 B2 | 12/2008 | Ung et al. |
| 7,489,298 B2 | 2/2009 | Liberty et al. |
| 7,489,299 B2 | 2/2009 | Liberty et al. |
| 7,545,926 B2 | 6/2009 | Mao |
| 7,558,698 B2 | 7/2009 | Funge et al. |
| 7,565,295 B1 | 7/2009 | Hernandez-Rebollar |
| 7,613,310 B2 | 11/2009 | Mao |
| 7,613,610 B1 | 11/2009 | Zimmerman et al. |
| 7,623,115 B2 | 11/2009 | Marks |
| 7,626,569 B2 | 12/2009 | Lanier |
| 7,627,139 B2 | 12/2009 | Marks et al. |
| 7,636,645 B1 | 12/2009 | Yen et al. |
| 7,646,372 B2 | 1/2010 | Marks et al. |
| 7,697,700 B2 | 4/2010 | Mao |
| 7,721,231 B2 | 5/2010 | Wilson |
| 7,783,061 B2 | 8/2010 | Zalewski et al. |
| 7,809,145 B2 | 10/2010 | Mao |
| 7,883,415 B2 | 2/2011 | Larsen et al. |
| 7,918,733 B2 | 4/2011 | Zalewski et al. |
| 7,970,147 B2 | 6/2011 | Mao |
| 8,073,157 B2 | 12/2011 | Mao et al. |
| 8,797,260 B2 * | 8/2014 | Mao ................ A63F 13/06 345/156 |
| 2001/0056477 A1 | 12/2001 | Mcternan et al. |
| 2002/0010655 A1 | 1/2002 | Kjallstrom |
| 2002/0015137 A1 | 2/2002 | Hasegawa |
| 2002/0021277 A1 | 2/2002 | Kramer et al. |
| 2002/0024500 A1 | 2/2002 | Howard |
| 2002/0036617 A1 | 3/2002 | Pryor |
| 2002/0041327 A1 | 4/2002 | Hildreth et al. |
| 2002/0056114 A1 | 5/2002 | Fillebrown et al. |
| 2002/0065121 A1 * | 5/2002 | Fukunaga ............... A63F 13/08 463/8 |
| 2002/0072414 A1 | 6/2002 | Stylinski et al. |
| 2002/0075286 A1 | 6/2002 | Yonezawa et al. |
| 2002/0083461 A1 | 6/2002 | Hutcheson et al. |
| 2002/0085097 A1 | 7/2002 | Colmenarez et al. |
| 2002/0094189 A1 | 7/2002 | Navab et al. |
| 2002/0101568 A1 | 8/2002 | Eberl et al. |
| 2002/0110273 A1 | 8/2002 | Dufour |
| 2002/0126899 A1 | 9/2002 | Farrell |
| 2002/0134151 A1 | 9/2002 | Naruoka et al. |
| 2002/0158873 A1 | 10/2002 | Williamson |
| 2002/0160836 A1 | 10/2002 | Watanabe et al. |
| 2002/0196445 A1 * | 12/2002 | McClary ................ G01C 19/56 356/475 |
| 2003/0014212 A1 | 1/2003 | Ralston et al. |
| 2003/0020718 A1 | 1/2003 | Marshall et al. |
| 2003/0021492 A1 | 1/2003 | Matsuoka et al. |
| 2003/0022716 A1 | 1/2003 | Park et al. |
| 2003/0032466 A1 | 2/2003 | Watashiba |
| 2003/0032484 A1 | 2/2003 | Ohshima et al. |
| 2003/0053031 A1 | 3/2003 | Wirth |
| 2003/0063064 A1 | 4/2003 | Braun et al. |
| 2003/0063065 A1 | 4/2003 | Lee et al. |
| 2003/0093591 A1 | 5/2003 | Hohl |
| 2003/0100363 A1 | 5/2003 | Ali |
| 2003/0120714 A1 | 6/2003 | Wolff et al. |
| 2003/0123705 A1 | 7/2003 | Stam et al. |
| 2003/0149803 A1 | 8/2003 | Wilson |
| 2003/0160862 A1 | 8/2003 | Charlier et al. |
| 2003/0169233 A1 | 9/2003 | Hansen |
| 2003/0193572 A1 | 10/2003 | Wilson et al. |
| 2003/0232649 A1 | 12/2003 | Gizis et al. |
| 2004/0001082 A1 | 1/2004 | Said |
| 2004/0017355 A1 | 1/2004 | Shim |
| 2004/0029640 A1 | 2/2004 | Masuyama et al. |
| 2004/0032796 A1 | 2/2004 | Chu et al. |
| 2004/0046736 A1 | 3/2004 | Pryor et al. |
| 2004/0047464 A1 | 3/2004 | Yu et al. |
| 2004/0054512 A1 | 3/2004 | Kim et al. |
| 2004/0060355 A1 | 4/2004 | Nemirovsky et al. |
| 2004/0063480 A1 | 4/2004 | Wang |
| 2004/0063481 A1 | 4/2004 | Wang |
| 2004/0070564 A1 | 4/2004 | Dawson et al. |
| 2004/0070565 A1 | 4/2004 | Nayar et al. |
| 2004/0087366 A1 | 5/2004 | Shum et al. |
| 2004/0095327 A1 | 5/2004 | Lo |
| 2004/0118207 A1 | 6/2004 | Niendorf et al. |
| 2004/0120008 A1 | 6/2004 | Morgan |
| 2004/0140955 A1 | 7/2004 | Metz |
| 2004/0140962 A1 | 7/2004 | Wang et al. |
| 2004/0145457 A1 | 7/2004 | Schofield et al. |
| 2004/0147818 A1 | 7/2004 | Levy et al. |
| 2004/0150728 A1 | 8/2004 | Ogino |
| 2004/0155962 A1 | 8/2004 | Marks |
| 2004/0178576 A1 | 9/2004 | Hillis et al. |
| 2004/0180720 A1 | 9/2004 | Nashi et al. |
| 2004/0212589 A1 | 10/2004 | Hall et al. |
| 2004/0213419 A1 | 10/2004 | Varma et al. |
| 2004/0227725 A1 | 11/2004 | Calarco et al. |
| 2004/0239670 A1 | 12/2004 | Marks |
| 2004/0240542 A1 | 12/2004 | Yeredor et al. |
| 2004/0254017 A1 | 12/2004 | Cheng et al. |
| 2005/0037844 A1 | 2/2005 | Shum et al. |
| 2005/0047611 A1 | 3/2005 | Mao |
| 2005/0059488 A1 | 3/2005 | Larsen et al. |
| 2005/0075167 A1 | 4/2005 | Beaulieu et al. |
| 2005/0078088 A1 | 4/2005 | Davis et al. |
| 2005/0088369 A1 | 4/2005 | Yoshioka |
| 2005/0102374 A1 | 5/2005 | Moragne et al. |
| 2005/0105777 A1 | 5/2005 | Kozlowski et al. |
| 2005/0110949 A1 | 5/2005 | Goldfain et al. |

(56) References Cited

U.S. PATENT DOCUMENTS

| | | |
|---|---|---|
| 2005/0117045 A1 | 6/2005 | Abdellatif et al. |
| 2005/0162384 A1 | 7/2005 | Yokoyama |
| 2005/0174324 A1 | 8/2005 | Liberty et al. |
| 2005/0198095 A1 | 9/2005 | Du et al. |
| 2005/0226431 A1 | 10/2005 | Mao |
| 2005/0239548 A1 | 10/2005 | Ueshima et al. |
| 2005/0256391 A1 | 11/2005 | Satoh et al. |
| 2006/0033713 A1 | 2/2006 | Pryor |
| 2006/0035710 A1 | 2/2006 | Festejo et al. |
| 2006/0038819 A1 | 2/2006 | Festejo et al. |
| 2006/0204012 A1 | 9/2006 | Marks et al. |
| 2006/0233389 A1 | 10/2006 | Mao et al. |
| 2006/0239471 A1 | 10/2006 | Mao et al. |
| 2006/0252474 A1 | 11/2006 | Zalewski et al. |
| 2006/0252475 A1 | 11/2006 | Zalewski et al. |
| 2006/0252477 A1 | 11/2006 | Zalewski et al. |
| 2006/0252541 A1 | 11/2006 | Zalewski et al. |
| 2006/0252543 A1 | 11/2006 | Van Noland et al. |
| 2006/0256081 A1 | 11/2006 | Zalewski et al. |
| 2006/0264258 A1 | 11/2006 | Zalewski et al. |
| 2006/0264259 A1 | 11/2006 | Zalewski et al. |
| 2006/0264260 A1 | 11/2006 | Zalewski et al. |
| 2006/0269072 A1 | 11/2006 | Mao |
| 2006/0269073 A1 | 11/2006 | Mao |
| 2006/0274032 A1 | 12/2006 | Mao et al. |
| 2006/0274911 A1 | 12/2006 | Mao et al. |
| 2006/0277571 A1 | 12/2006 | Marks et al. |
| 2006/0280312 A1 | 12/2006 | Mao |
| 2006/0282873 A1 | 12/2006 | Zalewski et al. |
| 2006/0287084 A1 | 12/2006 | Mao et al. |
| 2006/0287085 A1 | 12/2006 | Mao et al. |
| 2006/0287086 A1 | 12/2006 | Zalewski et al. |
| 2006/0287087 A1 | 12/2006 | Zalewski et al. |
| 2007/0015558 A1 | 1/2007 | Zalewski et al. |
| 2007/0015559 A1 | 1/2007 | Zalewski et al. |
| 2007/0021208 A1 | 1/2007 | Mao et al. |
| 2007/0025562 A1 | 2/2007 | Zalewski et al. |
| 2007/0060336 A1 | 3/2007 | Marks et al. |
| 2007/0061413 A1 | 3/2007 | Larsen et al. |
| 2007/0066394 A1 | 3/2007 | Ikeda et al. |
| 2007/0072675 A1 | 3/2007 | Hamano et al. |
| 2007/0081695 A1 | 4/2007 | Foxlin et al. |
| 2007/0113653 A1 | 5/2007 | Nasiri et al. |
| 2007/0120834 A1 | 5/2007 | Boillot |
| 2007/0120996 A1 | 5/2007 | Boillot |
| 2007/0213127 A1 | 9/2007 | Sato |
| 2007/0216894 A1* | 9/2007 | Garcia ............... G01B 11/2545 356/4.01 |
| 2007/0258599 A1 | 11/2007 | Mao |
| 2007/0260340 A1 | 11/2007 | Mao |
| 2007/0260517 A1 | 11/2007 | Zalewski et al. |
| 2007/0261077 A1 | 11/2007 | Zalewski et al. |
| 2007/0274535 A1 | 11/2007 | Mao |
| 2007/0298882 A1 | 12/2007 | Marks et al. |
| 2008/0056561 A1 | 3/2008 | Sawachi |
| 2008/0070684 A1 | 3/2008 | Haigh-Hutchinson |
| 2008/0091421 A1 | 4/2008 | Gustavsson |
| 2009/0010494 A1 | 1/2009 | Bechtel et al. |
| 2009/0016642 A1 | 1/2009 | Hart |
| 2009/0143877 A1 | 6/2009 | Panje |
| 2009/0221368 A1 | 9/2009 | Yen et al. |
| 2009/0221374 A1 | 9/2009 | Yen et al. |
| 2009/0288064 A1 | 11/2009 | Yen et al. |
| 2010/0004896 A1 | 1/2010 | Yen et al. |
| 2010/0137064 A1 | 6/2010 | Shum et al. |

FOREIGN PATENT DOCUMENTS

| | | | |
|---|---|---|---|
| EP | 0652686 | A | 5/1995 |
| EP | 0750202 | A | 12/1996 |
| EP | 0823683 | A | 2/1998 |
| EP | 0835676 | A | 4/1998 |
| EP | 0867798 | A | 9/1998 |
| EP | 0869458 | A | 10/1998 |
| EP | 1033882 | A | 9/2000 |
| EP | 1074934 | A | 2/2001 |
| EP | 1098686 | A | 5/2001 |
| EP | 1180384 | A | 2/2002 |
| EP | 1279425 | A | 1/2003 |
| EP | 1335338 | A | 8/2003 |
| EP | 1358918 | A | 11/2003 |
| EP | 1402929 | A | 3/2004 |
| EP | 1411461 | A | 4/2004 |
| EP | 1435258 | A | 7/2004 |
| EP | 1489596 | A | 12/2004 |
| FR | 2780176 | A | 12/1999 |
| FR | 2814965 | A | 4/2002 |
| FR | 2832892 | A | 5/2003 |
| GB | 2206716 | A | 1/1989 |
| GB | 2376397 | A | 12/2002 |
| GB | 2388418 | A | 11/2003 |
| JP | 1284897 | | 11/1989 |
| JP | 06042971 | | 2/1994 |
| JP | 6102980 | | 4/1994 |
| JP | 9128141 | | 5/1997 |
| JP | 9185456 | | 7/1997 |
| JP | 9265346 | | 10/1997 |
| JP | 11038949 | | 2/1999 |
| JP | 11253656 | | 9/1999 |
| JP | 2006110382 | A | 10/1999 |
| JP | 11312040 | | 11/1999 |
| JP | 11316646 | A | 11/1999 |
| JP | 2001246161 | A | 12/1999 |
| JP | 2000172431 | A | 6/2000 |
| JP | 2000259856 | A | 9/2000 |
| JP | 2000308756 | A | 11/2000 |
| JP | 2000352712 | A | 12/2000 |
| JP | 2002306846 | A | 4/2001 |
| JP | 2002320772 | A | 4/2001 |
| JP | 2001166676 | A | 6/2001 |
| JP | 2002153673 | A | 5/2002 |
| JP | 2002369969 | A | 12/2002 |
| JP | 2004145448 | A | 5/2004 |
| JP | 2004302993 | A | 10/2004 |
| JP | 2005021458 | A | 1/2005 |
| JP | 2005046422 | A | 2/2005 |
| JP | 200675218 | | 3/2006 |
| WO | 8805942 | A | 8/1988 |
| WO | 9848571 | A | 10/1998 |
| WO | 9926198 | A | 5/1999 |
| WO | 9935633 | A | 7/1999 |
| WO | 0118563 | A | 3/2001 |
| WO | 0227456 | A | 4/2002 |
| WO | 02052496 | A | 7/2002 |
| WO | 03079179 | A | 9/2003 |
| WO | 2004073814 | A | 9/2004 |
| WO | 2004073815 | A | 9/2004 |
| WO | 2005073838 | A | 8/2005 |
| WO | 2005107911 | A | 11/2005 |
| WO | 2006121896 | A | 11/2006 |
| WO | 2007095082 | A | 8/2007 |
| WO | 2008056180 | A | 5/2008 |

OTHER PUBLICATIONS

"European Search Report" for European Application No. 07251651.1 dated Oct. 18, 2007.

"The Tracking Cube: A Three Dimensional Input Device", IBM Technical Disclosure Bulletin, Aug. 1, 1989, pp. 91-95, vol. 32, No. 3b, IBM Corp. new York, US.

Advisory Action dated Feb. 2, 2010 issued for U.S. Appl. No. 11/382,252.

Advisory Action dated Jul. 20, 2009 issued for U.S. Appl. No. 11/382,033.

Advisory Action for U.S. Appl. No. 11/382,036, dated Mar. 21, 2013.

Bolt, R. A., "Put-that-there: Voice and Gesture at the Graphics Interface", Computer Graphics, vol. 14, No. 3 (ACM SIGGRAPH Conference Proceedings) Jul. 1980, pp. 262-270.

Definition of "mount"—Merriam-Webster Online Dictionary; downloaded from the Internet <http://www.m-w.com/dictionary/mountable, downloaded on Nov. 8, 2007.

(56) References Cited

OTHER PUBLICATIONS

DeWitt, Thomas and Edelstein, Phil "Pantomation: A System for Position Tracking", Proceedings of the 2nd Symposium on Small Computers in the Arts, Oct. 1982, pp. 61-69.
Final Office Action dated Apr. 28, 2009 for U.S. Appl. No. 11/382,033.
Final Office Action dated Apr. 29, 2009 for U.S. Appl. No. 11/382,036.
Final Office Action dated Jan. 17, 2008 for U.S. Appl. No. 11/382,252.
Final Office Action dated Mar. 19, 2009 for U.S. Appl. No. 11/382,031.
Final Office Action dated May 1, 2009 for U.S. Appl. No. 11/382,250.
Final Office Action dated Nov. 12, 2009 for U.S. Appl. No. 11/382,252.
Final Office Action dated Nov. 26, 2008 for U.S. Appl. No. 11/382,252.
Final Office Action for U.S. Appl. No. 11/382,033, dated Dec. 19, 2012.
Final Office Action for U.S. Appl. No. 11/382,035, dated Dec. 13, 2012.
Final Office Action for U.S. Appl. No. 11/382,035, dated Dec. 28, 2009.
Final Office Action for U.S. Appl. No. 11/382,035, dated Dec. 6, 2013.
Final Office Action for U.S. Appl. No. 11/382,035, dated Jan. 7, 2009.
Final Office Action for U.S. Appl. No. 11/382,035, dated Jun. 21, 2011.
Final Office Action for U.S. Appl. No. 11/382,035, dated Sep. 14, 2010.
Final Office Action for U.S. Appl. No. 11/382,036, dated Jan. 3, 2013.
Final Office Action for U.S. Appl. No. 11/382,036, dated Jul. 26, 2010.
Final Office Action for U.S. Appl. No. 11/382,036, dated Sep. 7, 2011.
Final Office Action for U.S. Appl. No. 11/382,252, dated Nov. 21, 2011.
Frank Dietrich; " Real Time Animation Techniques with Microcomputers"; Pixel Creations; University of Michigan 1982.
Fujitsu, "Internet Development of Emulators" Abstract, Mar. 1997, vol. 48, No. 2.
Gvili, et al., "Depth Keying", SPIE vol. 5006 (2003), 2003 SPIE—IS&T, pp. 564-574 (031).
Hemmi, et al., "3-D Natural Interactive Interface Using Marker Tracking from a Single View", Sep. 9, 1991, Systems and Computers in Japan.
Iddan et al. "3D Imaging in the Studio (and Elswhere . . . )", Proceedings of the SPIE, SPIE, Bellingham, VA, US, Vol. 4298, Jan. 24, 2001, pp. 48-55, XP008005351.
International Search Report and Written Opinion for International Application No. PCT/US06/61056 dated Mar. 3, 2008.
International Search Report and Written Opinion of the International Searching Authority for International Patent Application No. PCT/US07/67004 dated Jul. 28, 2008.
Jaron Lanier, "Virtually There", Scientific American: New Horizons for Information Technology, 2003.
Jojie, et al., "Tracking Self-Occluding Articulated Objects in Dense Disparity Maps", Computer Vision, 1999, the Proceedings of the Seventh IEEE International Conference on Kerkyra, Greece Sep. 20-27, 1999, (Sep. 20, 1999), pp. 123-130.
K.B. Shimoga, et al., "Touch and Force Reflection for Telepresence Surgery", Engineering in Medicine and Biology Opportunities of the IEEE, Baltimore, MD, USA, Nov. 3, 1994, New York, New York, USA, pp. 1049-1050.
Kanade, et al., "A Stereo Machine for Vide-rate Dense Depth Mapping and Its new Application" 1996, CVPR 96, IEEE Computer Society Conference, pp. 196-202 (022).

Kevin W. Wilson et al., "Audio-Video Array Source Localization for Intelligent Environments", IEEE 2002, vol. 2, pp. 2109-2112.
Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.
Lanier, Jaron "Virtually there: three-dimensionaltele-immersion may eventually bring the world to your desk" http://cs.unc.edu/Research/stc/inthenews/pdf/sciam_2001_0401.pdf, downloaded from the Internet on Mar. 23, 2011.
Mark Fiala et al., "A Panoramic Video and Acoustic Beamforming Sensor for Videoconferencing", IEEE, Oct. 2-3, 2004, pp. 47-52.
Mihara, et al., "A Realtime Vision-Based Interface Using Motion Processor and Applications to Robotics", vol. J84-D-11, No. 9, pp. 2070-2078, Sep. 2001, Japan.
Nakagawa, et al., "A Collision Detection and Motion Image Synthesis Between a Background Image and a Foreground 3-Dimensional Object", TVRSJ vol. 4, No. 2, pp. 425-430, 1999, Japan.
Nakamura, et al., A Consideration on Reconstructing 3-D Model Using Object Views:, 2004-01601-003, pp. 17-21, Kokkaido University, Japan, nakamura@media.eng.hokudai.ac.jp.
Nishida, et al., "A Method of Estimating Human Shapes by Fitting the Standard Human Model to Partial Measured Data", D-II vol. J84-D-II, No. 7, pp. 1310-1318, Jul. 2001.
Non-final Office Action dated Sep. 5, 2008 for U.S. Appl. No. 11/382,033.
Non-Final Office Action for U.S. Appl. No. 11/382,022, dated Mar. 28, 2013.
Non-Final Office Action for U.S. Appl. No. 11/382,035, dated Dec. 23, 2010.
Non-Final Office Action for U.S. Appl. No. 11/382,035, dated Jul. 25, 2008.
Non-Final Office Action for U.S. Appl. No. 11/382,035, dated Mar. 30, 2010.
Decision to Grant for JP Application No. 2012-257118, dated Sep. 30, 2014.
Non-Final Office Action for U.S. Appl. No. 11/382,252, dated Jun. 23, 2015.
Japanese Office Action for JP Application No. 2013-021698, dated Aug. 13, 2014.
Non-Final Office Action for U.S. Appl. No. 11/382,252, dated Aug. 4, 2014.
Final Office Action for U.S. Appl. No. 11/382,252, dated Feb. 4, 2015.
Final Office Action for U.S. Appl. No. 12/891,633, dated Jan. 28, 2015.
Notice of Allowance for U.S. Appl. No. 11/381,721, dated Dec. 15, 2014.
Non-Final Office Action for U.S. Appl. No. 11/382,252, dated Nov. 19, 2015.
Non-Final Office Action for U.S. Appl. No. 11/382,035, dated May 10, 2013.
Non-Final Office Action for U.S. Appl. No. 11/382,035, dated May 27, 2009.
Non-Final Office Action for U.S. Appl. No. 11/382,035, dated Oct. 11, 2011.
Non-Final Office Action for U.S. Appl. No. 11/382,036, dated Jan. 5, 2011.
Non-Final Office Action for U.S. Appl. No. 11/382,251, dated Nov. 23, 2011.
Notice of Allowance for U.S. Appl. No. 11/382,035, dated Mar. 26, 2014.
Office Action dated Apr. 23, 2010 issued for U.S. Appl. No. 11/382,252.
Office Action dated Aug. 8, 2007 for U.S. Appl. No. 11/382,252.
Office Action dated Dec. 28, 2010 issued for U.S. Appl. No. 11/382,252.
Office Action dated Jun. 24, 2009 for U.S. Appl. No. 11/382,252.
Office Action dated May 13, 2008 for U.S. Appl. No. 11/382,252.
Office Action dated Nov. 30, 2009 for U.S. Appl. No. 11/382,036.
Office Action dated Sep. 2, 2009 for U.S. Appl. No. 11/382,031.
Office Action dated Sep. 25, 2009 for U.S. Appl. No. 11/382,032.
Office Action for U.S. Appl. No. 11/381,721, dated Jun. 28, 2011.

(56) References Cited

OTHER PUBLICATIONS

Office Action for U.S. Appl. No. 11/382,033, dated Jun. 21, 2011.
Office Action for U.S. Appl. No. 11/382,036 dated Aug. 28, 2008.
Office Action for U.S. Appl. No. 11/382,250 dated FA Jul. 22, 2008.
Office Action for U.S. Appl. No. 11/382,031 dated Sep. 30, 2008.
Office Action for U.S. Appl. No. 11/382,038 dated May 14, 2007.
Office Action for U.S. Appl. No. 11/382,040 dated May 14, 2007.
Office Action for U.S. Appl. No. 11/382,040 dated Oct. 31, 2007.
Office Action for U.S. Appl. No. 11/382,041 dated May 14, 2007.
Richardson et al., "Virtual Network Computing" IEEE Internet Computing, vol. 2, No. 1 Jan.-Feb. 1998.
Richardson et al. "Virtual Network Computing", 1998, IEEE Internet Computing vol. 2.
Rodger Richey—"Measure Tilt Using PIC16F84A & ADXL202", AN715, Microchip Technology Inc., 1999.
U.S. Appl. No. 29/246,744, entitled "Video Game Controller Front Face," to Teiyu Goto, filed May 8, 2006.
U.S. Appl. No. 29/246,743, entitled "Video Game Controller," to Teiyu Goto, filed May 8, 2006.
U.S. Appl. No. 29/246,759, entitled "Game Controller Device With LEDs and Optical Ports" filed May 8, 2006.
U.S. Appl. No. 29/246,762, entitled "Ergonomic Game Interface Device With LEDs and Optical Ports" filed May 8, 2006.
U.S. Appl. No. 29/246,763, entitled "Ergonomic Game Controller Device With LEDs and Optical Ports" filed May 8, 2006.
U.S. Appl. No. 29/246,765, entitled "Design for Optical Game Controller Interface" filed May 8, 2006.
U.S. Appl. No. 29/246,766, entitled "Dual Grip Game Control Device With LEDs and Optical Ports" filed May 8, 2006.
U.S. Appl. No. 29/246,767, entitled"Video Game Controller," filed May 8, 2006.
U.S. Appl. No. 29/246,768, entitled "Video Game Controller," filed May 8, 2006.
U.S. Appl. No. 29/259,348, entitled, "Tracked Controller Device," to Gary Zalewski, filed May 6, 2006.
U.S. Appl. No. 29/259,349 entitled, "Controller With Infrared Port," to Teiyu Goto, filed May 6, 2006.
U.S. Appl. No. 29/259,350, entitled, "Controller With Tracking Sensors," to Gary Zalewski, filed May 6, 2006.
U.S. Appl. No. 601798,031 entitled, "Dynamic Target Interface," to Bruce Woodard, filed May 6, 2006.
U.S. Appl. No. 60/679,413, to Richard L. Marks, filed Sep. 15, 2005.
U.S. Appl. No. 60/718,145, to Gustavo Henandez-Abrego, filed Sep. 15, 2005.
XP-002453974, "CFS and FS95/98/2000: How to Use the Trim Controls to Keep Your Aircraft Level", Aug. 10, 2007, http://support.microsoft.com/?scid=kb%Ben-us&3B175195&x=13&y=15.
Y. Ephraim and D. Malah, "Speech Enhancement Using a Minimum Mean-square Error Log-Spectral Amplitude Estimator," IEEE Trans. Acoust., Speech, Signal Processing, vol. ASSP-33, pp. 443-445, Apr. 1985.
Y. Ephraim and D. Malah, "Speech Enhancement Using a Minimum Mean-square Error Short-time Spectral Amplitude Estimator," IEEE Trans. Acoust., Speech, Signal Processing, vol. ASSP-32, pp. 1109-1121.
Non-Final Office Action for U.S. Appl. No. 12/891,633, dated Mar. 10, 2016.
Design and implementation of a 3D computer game controller using inertial MEMS sensors [online] [dated 20041. [retrieved Sep. 13, 2016]. Retrieved from the Internet: chttp:lldigitalcommons.mtu.edulcgilviewcontent.cgi?article=I5778,context=etds>.
Final Office Action for U.S. Appl. No. 11/382,252, dated Sep. 23, 2016.
Non-Final Office Action for U.S. Appl. No. 11/382,252, dated Jun. 6, 2016.

\* cited by examiner

INERTIALLY TRACKABLE HAND-HELD CONTROLLER

CLAIM OF PRIORITY

This application is a continuation of U.S. patent application Ser. No. 11/382,035, to Xiaodong Mao, et al., entitled "INERTIALLY TRACKABLE HAND-HELD CONTROLLER", filed on May 6, 2006, which is a continuation in part (CIP) of U.S. patent application Ser. No. 10/207,677, entitled, "MAN-MACHINE INTERFACE USING A DEFORMABLE DEVICE", filed on Jul. 27, 2002; U.S. patent application Ser. No. 10/650,409, entitled, "AUDIO INPUT SYSTEM", filed on Aug. 27, 2003; U.S. patent application Ser. No. 10/663,236, entitled "METHOD AND APPARATUS FOR ADJUSTING A VIEW OF A SCENE BEING DISPLAYED ACCORDING TO TRACKED HEAD MOTION", filed on Sep. 15, 2003; U.S. patent application Ser. No. 10/759,782, entitled "METHOD AND APPARATUS FOR LIGHT INPUT DEVICE", filed on Jan. 16, 2004; U.S. patent application Ser. No. 10/820,469, entitled "METHOD AND APPARATUS TO DETECT AND REMOVE AUDIO DISTURBANCES", filed on Apr. 7, 2004; and U.S. patent application Ser. No. 11/301,673, entitled "METHOD FOR USING RELATIVE HEAD AND HAND POSITIONS TO ENABLE A POINTING INTERFACE VIA CAMERA TRACKING", filed on Dec. 12, 2005, U.S. patent application Ser. No. 11/381,729, to Xiao Dong Mao, entitled ULTRA SMALL MICROPHONE ARRAY, application Ser. No. 11/381,728, to Xiao Dong Mao, entitled ECHO AND NOISE CANCELLATION, filed on May 4, 2006, U.S. patent application Ser. No. 11/381,725, to Xiao Dong Mao, entitled "METHODS AND APPARATUS FOR TARGETED SOUND DETECTION", filed on May 4, 2006, U.S. patent application Ser. No. 11/381,727, to Xiao Dong Mao, entitled "NOISE REMOVAL FOR ELECTRONIC DEVICE WITH FAR FIELD MICROPHONE ON CONSOLE", filed on May 4, 2006, U.S. patent application Ser. No. 11/381,724, to Xiao Dong Mao, entitled "METHODS AND APPARATUS FOR TARGETED SOUND DETECTION AND CHARACTERIZATION", filed on May 4, 2006, U.S. patent application Ser. No. 11/381,721, to Xiao Dong Mao, entitled "SELECTIVE SOUND SOURCE LISTENING IN CONJUNCTION WITH COMPUTER INTERACTIVE PROCESSING", filed on May 4, 2006; all of which are hereby incorporated herein by reference.

U.S. patent application Ser. No. 11/382,035 also claims benefit of U.S. Provisional Patent Application No. 60/718, 145, entitled "AUDIO, VIDEO, SIMULATION, AND USER INTERFACE PARADIGMS", filed Sep. 15, 2005, which is hereby incorporated herein by reference.

CROSS-REFERENCE TO RELATED APPLICATIONS

This application is related to co-pending application Ser. No. 11/418,988, to Xiao Dong Mao, entitled "METHODS AND APPARATUSES FOR ADJUSTING A LISTENING AREA FOR CAPTURING SOUNDS", filed on May 4, 2006, the entire disclosures of which are incorporated herein by reference. This application is also related to co-pending application Ser. No. 11/418,989, to Xiao Dong Mao, entitled "METHODS AND APPARATUSES FOR CAPTURING AN AUDIO SIGNAL BASED ON VISUAL IMAGE", filed on May 4, 2006, the entire disclosures of which are incorporated herein by reference. This application is also related to co-pending application Ser. No. 11/429,047, to Xiao Dong Mao, entitled "METHODS AND APPARATUSES FOR CAPTURING AN AUDIO SIGNAL BASED ON A LOCATION OF THE SIGNAL", filed on May 4, 2006, the entire disclosures of which are incorporated herein by reference. This application is also related to co-pending application Ser. No. 11/429,133, to Richard Marks et al., entitled "SELECTIVE SOUND SOURCE LISTENING IN CONJUNCTION WITH COMPUTER INTERACTIVE PROCESSING", filed on May 4, 2006, the entire disclosures of which are incorporated herein by reference. This application is also related to co-pending application Ser. No. 11/429, 414, to Richard Marks et al., entitled "Computer Image and Audio Processing of Intensity and Input Devices for Interfacing With A Computer Program", filed on May 4, 2006, the entire disclosures of which are incorporated herein by reference.

1. This application is also related to co-pending application Ser. No. 11/382,031, entitled "MULTI-INPUT GAME CONTROL MIXER", filed on May 6, 2006, the entire disclosures of which are incorporated herein by reference.

2. This application is also related to co-pending application Ser. No. 11/382,032, entitled "SYSTEM FOR TRACKING USER MANIPULATIONS WITHIN AN ENVIRONMENT", filed on May 6, 2006, the entire disclosures of which are incorporated herein by reference.

3. This application is also related to co-pending application Ser. No. 11/382,033, entitled "SYSTEM, METHOD, AND APPARATUS FOR THREE-DIMENSIONAL INPUT CONTROL", filed on May 6, 2006, the entire disclosures of which are incorporated herein by reference.

4. This application is also related to co-pending application Ser. No. 11/382,036, entitled "METHOD AND SYSTEM FOR APPLYING GEARING EFFECTS TO VISUAL TRACKING", filed on May 6, 2006, the entire disclosures of which are incorporated herein by reference.

5. This application is also related to co-pending application Ser. No. 11/382,041, entitled "METHOD AND SYSTEM FOR APPLYING GEARING EFFECTS TO INERTIAL TRACKING", filed on May 6, 2006, the entire disclosures of which are incorporated herein by reference.

6. This application is also related to co-pending application Ser. No. 11/382,038, entitled "METHOD AND SYSTEM FOR APPLYING GEARING EFFECTS TO ACOUSTICAL TRACKING", filed on May 6, 2006, the entire disclosures of which are incorporated herein by reference.

7. This application is also related to co-pending application Ser. No. 11/382,040, entitled "METHOD AND SYSTEM FOR APPLYING GEARING EFFECTS TO MULTI-CHANNEL MIXED INPUT", filed on May 6, 2006, the entire disclosures of which are incorporated herein by reference.

8. This application is also related to co-pending application Ser. No. 11/382,034, entitled "SCHEME FOR DETECTING AND TRACKING USER MANIPULATION OF A GAME CONTROLLER BODY", filed on May 6, 2006, the entire disclosures of which are incorporated herein by reference.

9. This application is also related to co-pending application Ser. No. 11/382,037, entitled "SCHEME FOR TRANSLATING MOVEMENTS OF A HAND-HELD CONTROLLER INTO INPUTS FOR A SYSTEM", filed on May 6, 2006, the entire disclosures of which are incorporated herein by reference.

10. This application is also related to co-pending application Ser. No. 11/382,043, entitled "DETECTABLE AND TRACKABLE HAND-HELD CONTROLLER", filed on May 6, 2006, the entire disclosures of which are incorporated herein by reference.

11. This application is also related to co-pending application Ser. No. 11/382,039, entitled "METHOD FOR MAPPING MOVEMENTS OF A HAND-HELD CONTROLLER TO GAME COMMANDS", filed on May 6, 2006, the entire disclosures of which are incorporated herein by reference.

12. This application is also related to co-pending application Ser. No. 29/259,349, entitled "CONTROLLER WITH INFRARED PORT", filed on May 6, 2006, the entire disclosures of which are incorporated herein by reference.

13. This application is also related to co-pending application Ser. No. 29/259,350, entitled "CONTROLLER WITH TRACKING SENSORS", filed on May 6, 2006, the entire disclosures of which are incorporated herein by reference.

14. This application is also related to provisional application No. 60/798,031, entitled "DYNAMIC TARGET INTERFACE", filed on May 6, 2006, the entire disclosures of which are incorporated herein by reference.

15. This application is also related to co-pending application Ser. No. 29/259,348, entitled "TRACKED CONTROLLER DEVICE", filed on May 6, 2006, the entire disclosures of which are incorporated herein by reference.

FIELD OF THE INVENTION

The present invention relates generally to computer entertainment systems, and more specifically to a user's manipulation of a controller for such computer entertainment systems.

BACKGROUND OF THE INVENTION

Computer entertainment systems typically include a hand-held controller, game controller, or other controller. A user or player uses the controller to send commands or other instructions to the entertainment system to control a video game or other simulation being played. For example, the controller may be provided with a manipulator which is operated by the user, such as a joy stick. The manipulated variable of the joy stick is converted from an analog value into a digital value, which is sent to the game machine main frame. The controller may also be provided with buttons that can be operated by the user.

It is with respect to these and other background information factors that the present invention has evolved.

BRIEF DESCRIPTION OF THE DRAWINGS

The teachings of the present invention can be readily understood by considering the following detailed description in conjunction with the accompanying drawings, in which:

FIG. 3A is a three-dimensional schematic diagram illustrating an accelerometer that may be used in a controller according to an embodiment of the present invention;

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Various embodiments of the methods, apparatus, schemes and systems described herein provide for the detection, capture and tracking of the movements, motions and/or manipulations of the entire controller body itself by the user.

The detected movements, motions and/or manipulations of the entire controller body by the user may be used as additional commands to control various aspects of the game or other simulation being played.

Detecting and tracking a user's manipulations of a game controller body may be implemented in different ways. For example, in some embodiments an inertial sensor, such as an accelerometer or gyroscope, can be used with the computer entertainment system to detect motions of the hand-held controller body and transfer them into actions in a game. The inertial sensor can be used to detect many different types of motions of the controller, such as for example up and down movements, twisting movements, side to side movements, jerking movements, wand-like motions, plunging motions, etc. Such motions may correspond to various commands such that the motions are transferred into actions in a game.

Detecting and tracking the user's manipulations of a game controller body can be used to implement many different types of games, simulations, etc., that allow the user to, for example, engage in a sword or lightsaber fight, use a wand to trace the shape of items, engage in many different types of sporting events, engage in on-screen fights or other encounters, etc.

Figure 1A:
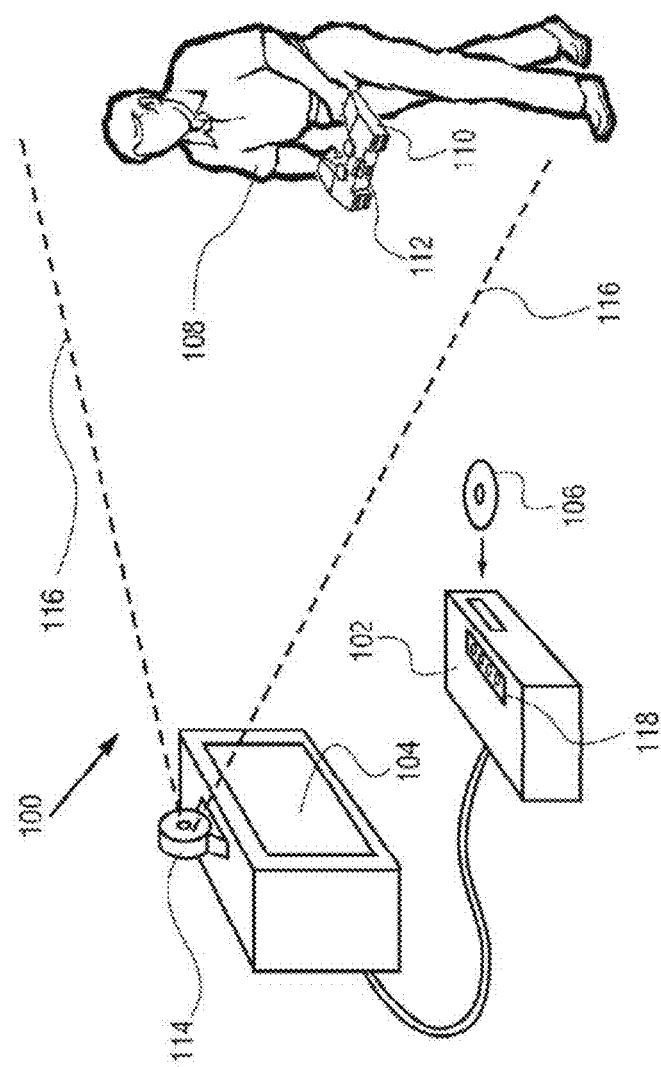
FIG. 1A is a pictorial diagram illustrating a video game system that operates in accordance with an embodiment of the present invention.
Figure 2:
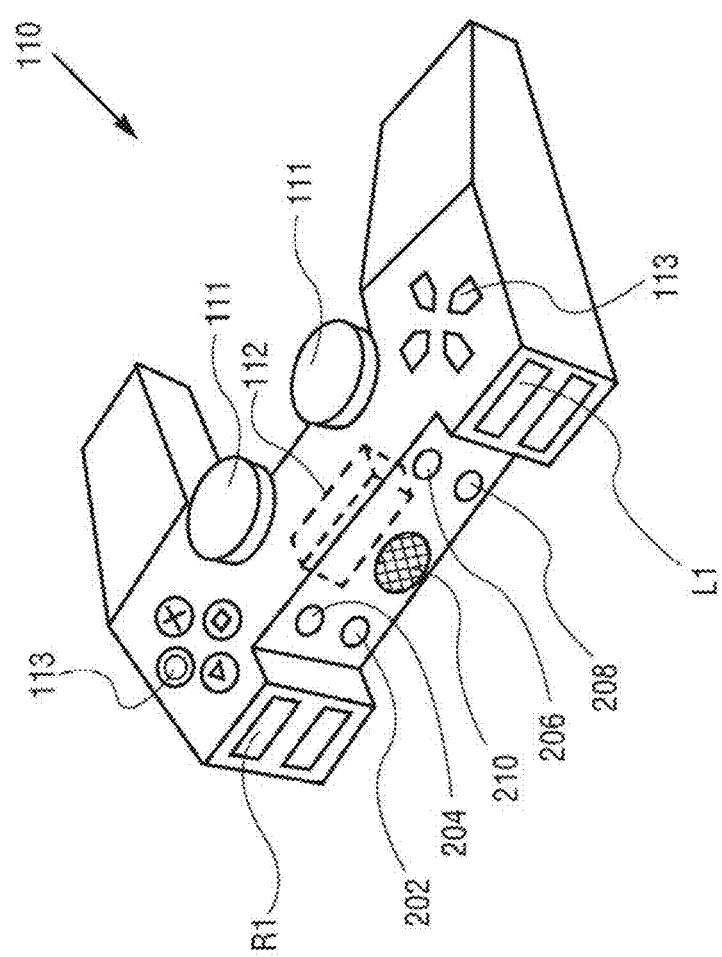
FIG. 2 is a perspective view of a controller made in accordance with an embodiment of the present invention.

Referring to FIG. 1A, there is illustrated a system 100 that operates in accordance with an embodiment of the present invention. As illustrated, a computer entertainment console 102 may be coupled to a television or other video display 104 to display the images of the video game or other simulation thereon. The game or other simulation may be stored on a DVD, CD, flash memory, USB memory, or other memory media 106 that is inserted into the console 102. A user or player 108 manipulates a game controller 110 to control the video game or other simulation. As seen in FIG. 2, the game controller 110 includes an inertial sensor 112 that produces signals in response to the position, motion, orientation or change in orientation of the game controller 110. In addition to the inertial sensor, the game controller 110 may include conventional control input devices, e.g., joysticks 111, buttons 113, R1, L1, and the like.

During operation, the user 108 physically moves the controller 110. For example, the controller 110 may be moved in any direction by the user 108, such as up, down, to one side, to the other side, twisted, rolled, shaken, jerked, plunged, etc. These movements of the controller 110 itself may be detected and captured by the camera 112 by way of tracking through analysis of signals from the inertial sensor 112 in a manner described below.

Referring again to FIG. 1A, the system 100 may optionally include a camera or other video image capturing device 114, which may be positioned so that the controller 110 is within the camera's field of view 116. Analysis of images from the image capturing device 114 may be used in conjunction with analysis of data from the inertial sensor 112.

Figure 1B:
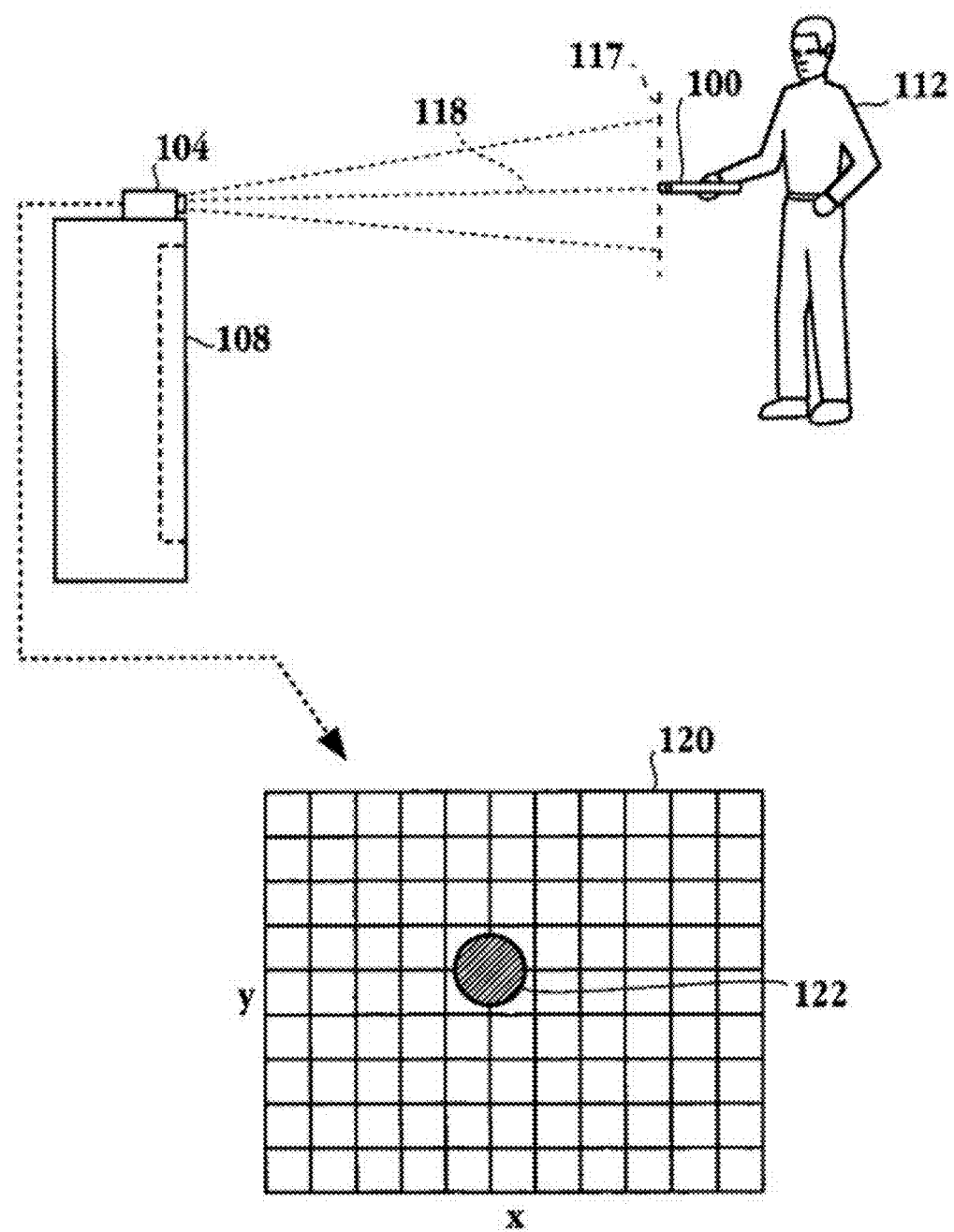
FIG. 1B is a simplified schematic diagram illustrating the capture of light from a light source through an image capture device in accordance with one embodiment of the invention.

FIG. 1B is a simplified schematic diagram illustrating the capture of light from a light source through an image capture device in accordance with one embodiment of the invention. Here, the user 108 is holding a controller 110 which includes a light source thereon. The image capturing device 114 monitors a field of view 116 through which light from the light source of the controller 110 is detected. The light source associated with controller 110 is within plane 117, which corresponds to digitized screen 120. Here, an image of the light source associated with controller 110 is illustrated by region 122 of screen 120. It should be appreciated that the resolution of screen 120 may be associated with any suitable resolution typical of a web cam or other suitable camera. In one embodiment, screen 120 is defined by a screen size of 320×240. Thus, as user 108 moves the controller 110, the associated movement is captured through image capture device 114 to determine a location of the light source within the screen 120. It should be appreciated that the screen size and the imaging device size are decoupled. However, the screen and image device size are mapped in order to determine corresponding positions between the two. In one embodiment, the image device is mapped to a region of the screen. Here, most of the screen is used for displaying a scene, game image, etc., and there is a relatively small input palette in a corner or some other suitable region of the screen.

Figure 1C:
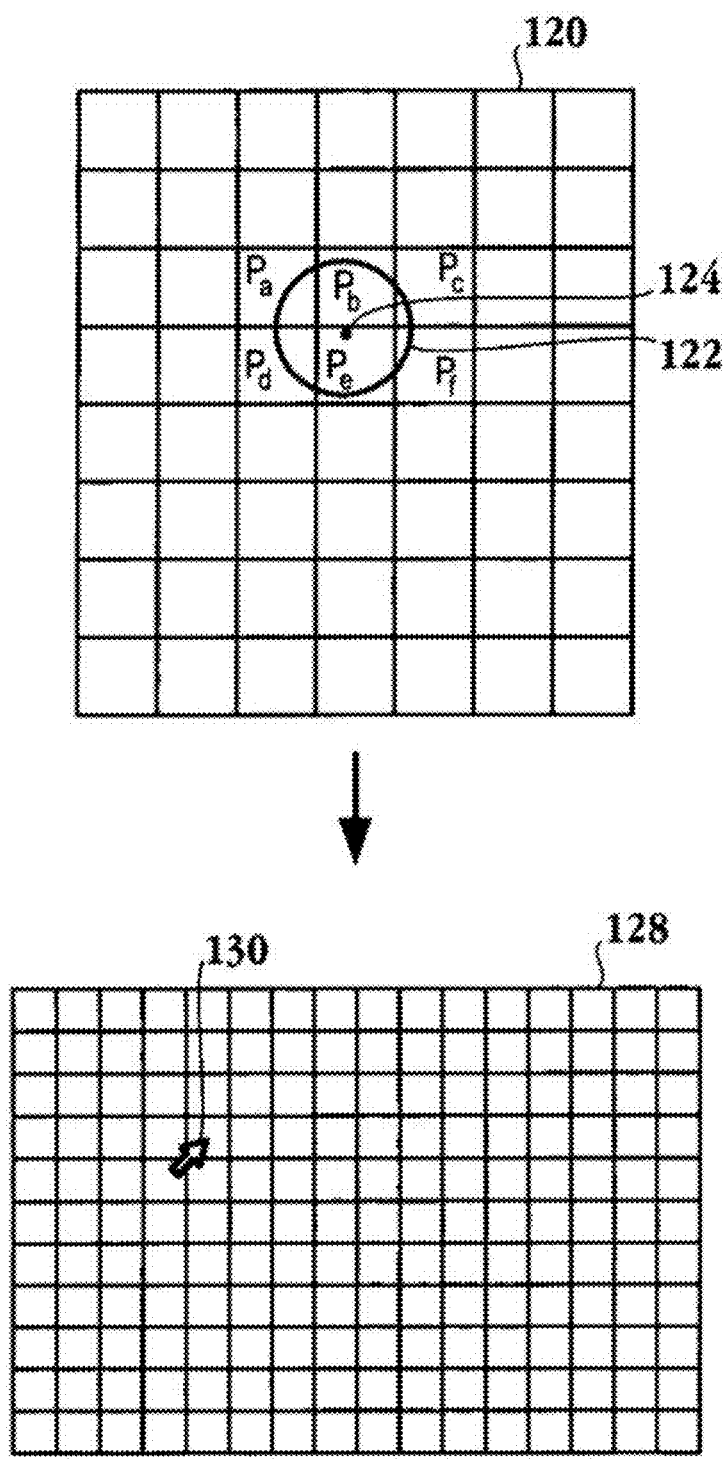
FIG. 1C is a schematic diagram illustrating the determination of the location of a light source and the subsequent translation of that location to control movement of a corresponding cursor on a display screen in accordance with one embodiment of the invention.

FIG. 1C is a schematic diagram illustrating the determination of the location of a light source and the subsequent translation of that location to control movement of a corresponding cursor on a display screen in accordance with one embodiment of the invention. Here, screen 120 defines an image of a light source as region 122. Region 122 includes portions of pixel $P_a$, $P_b$, $P_c$, $P_d$, $P_e$, and $P_f$. The remainder of each of the pixels in the screen 120, i.e., all pixels except pixels $P_a$-$P_f$ is black. In one embodiment, ensuring that the remainder of the pixels is black is achieved through a masking operation. The masking operation includes reducing the size of an aperture of the image capture device 114 in order to minimize an amount of light allowed into the image capture device. In one embodiment, the aperture size may be adjusted electronically by adjusting the sensor game and exposure time. This scheme enhances the ability to detect a light source while reducing interference effects associated with background lighting. It should be appreciated that since the characteristics of the light input device and the image capture device are known, then the image capture device parameters (white balance, gain, exposure, saturation, etc.) may be set explicitly to track a particular pre-determined pixel value, i.e., no calibration is required. As the input device is a light, the room lighting is not a factor here. Thus, an active method for detecting a light change is provided.

Still referring to FIG. 1C, a center 124 of region 122 is calculated through a centroid calculation in which the centers of each of pixels $P_a$-$P_f$ are calculated and then weighted according to the associated pixel value in order to determine the coordinates of center 124. The coordinates of center 124 are then mapped to display screen 128, which corresponds to the display screen being viewed by the user. Thus, movement of the light source will cause movement of region 122 on grid 120, which may also be referred to as a screen associated with the image capture device. The corresponding movement of region 122 will be associated with the calculation of a new center. The new center will then be mapped to a location on screen 128 in order to move cursor 130 on screen 128 so that the user is given a feeling of control, over the movement of cursor 130 through the LED input device. As will be explained in more detail below, the input device may have a button or some other suitable activation device which when pressed will cause the respective LED to change to a different color from a previous color. This different color is then captured by the image capture device 114. The detection of the different color results in different pixel values being associated with the change in color. For example, the pixels corresponding to region 122 will be associated with different values by the color change. The different pixel values will then signal the mode change similar to a mode change signal associated with a mouse click. Thus, a user may click and drag, highlight, etc., images on the display screen. That is, the user may perform any functionality achieved through a mouse associated with a computer.

In one embodiment, the centroid calculation is performed as described hereafter. The pixels not associated with pixels $P_a$-$P_f$, are assigned a value of 0 as no light is detected, i.e., the pixels are black. It should be appreciated that the masking technique described above may be used to ensure that the image capture device can lock in on a light emanating from an input device by reducing interference from background lighting. Each of pixels $P_a$-$P_f$ are assigned a value corresponding to the amount of area of the pixel intersecting with region 122. In one embodiment, where pixel values are assigned from 0-255, 0 corresponding to no light, pixel $P_e$ is assigned the highest value while pixel Pf is assigned the lowest value. For purposes of example, the pixel values of pixels $P_a$, $P_b$, $P_e$, $P_d$, $P_e$, and $P_f$ are 121, 230, 80, 123, 240, and 10, respectively. Each of pixels $P_a$-$P_f$ is associated with a respective pixel center point. Each of the two dimensional coordinates of each of the pixel centers is multiplied by the value of the respective pixel. These weighted values for one of the two dimensional coordinates are then summed together. In one embodiment, the summation of the weighted values for each coordinate is then divided by the summation of the pixel values associated with region 122 in order to provide the coordinates for the center of region 124. This technique may be described mathematically as:

$$(x,y)_{center} = \Sigma[[x_{pixel\ center}][\text{value of pixel for } x_{pixel\ center}]]/\Sigma(\text{pixel values}) \text{ and}$$

$$\Sigma[[y_{pixel\ center}][\text{value of pixel for } y_{pixel\ center}]]/\Sigma(\text{pixel values})$$

Here, $(x,y)_{center}$ represent the two coordinates of center 124, $x_{pixel\ center}$ represents the x coordinate for each of pixels $P_a$-$P_f$ and $y_{pixel\ center}$ represents the y coordinate for each of pixels $P_a$-$P_f$. Thus, center 124 corresponds to a certain location of the image of the capture device. This position corresponds to a location on screen 128. With reference to video frames, $(x,y)_{center}$ may be calculated for each frame of the video and the location of $(x,y)_{center}$ center is used to set a position of cursor 130 on screen 128. In one embodiment, a resolution associated with grid 120 is less than the resolution associated with screen 128, thereby enabling smooth movement of cursor 130 across screen 128. It will be apparent to one skilled in the art that a non-weighted centroid may also be determined, especially if the background is not known, e.g., the background is not all black. Here, the location of the centroid may not be as accurate as when the background is known, however, the accuracy is still suitable for the embodiments described herein. In one embodiment, the non-weighted centroid is calculated when the user is in a dark room or with an infrared LED and camera. It will be apparent to one skilled in the art that while FIGS. 1B, and 1C refer to a cursor, the embodiments are not limited to use with a cursor. In essence any suitable indicator that provides feedback on the second location of the input device may be used. For example, effects like distortion, brightening, darkening, telescope windowing, etc. may be employed to provide feedback on the second location of the input device.

Figure 1D:
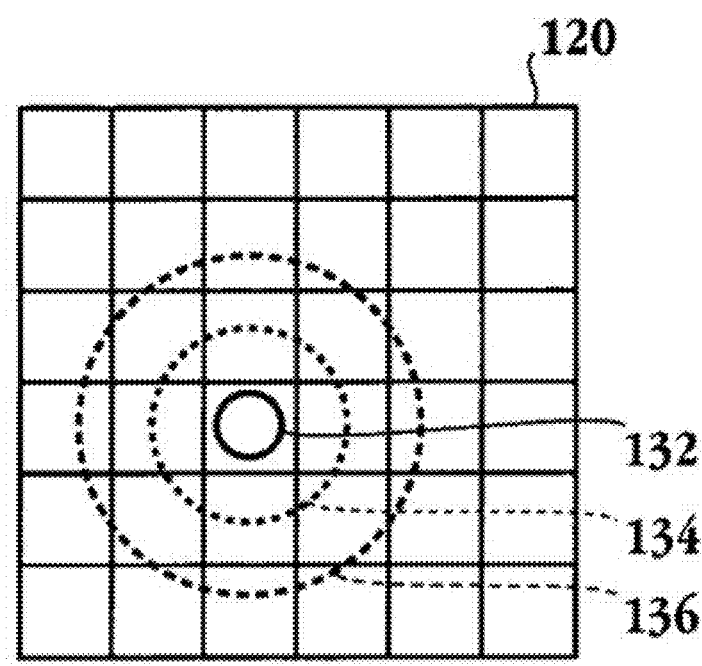
FIG. 1D is a schematic diagram illustrating a scheme for enhancing a tracking and translation methodology in accordance with one embodiment of the invention.

FIG. 1D is a schematic diagram illustrating a scheme for enhancing a tracking and translation methodology in accordance with one embodiment of the invention. It should be appreciated that where a light source is captured through image capture device 104 and subsequently located within screen 120, the corresponding region associated with the light source is contained within one pixel. Thus, the subsequent translation to a cursor may cause the cursor movement to appear jumpy, due to the quantization effect of the discrete sampling of the image capture device. In order to alleviate the jumpiness, image capture device may be defocused to blossom or expand the region associated with the light source. For example, region 132 represents an initial capture of a corresponding light source. As can be seen, region 132 is contained within one block of grid 120, which represents a single pixel. In order to expand or blossom region 132 the image capture device is defocused where regions 134 and 136 represent different defocusing parameters. Thereafter, the centroid of the expanded region may be calculated as discussed above. In one embodiment, a diffuser is placed over the LED to defocus the light source. For example, the diffuser may be a piece of tape that causes the light to diffuse.

As shown in FIG. 2, the controller may optionally be equipped with multiple light sources such as light emitting diodes (LEDs) 202, 204, 206, 208 to facilitate tracking by video analysis. Analysis of such video images for the purpose of tracking the controller 110 are described, e.g., in U.S. patent application Ser. No. 11/382,034, entitled "SCHEME FOR DETECTING AND TRACKING USER MANIPULATION OF A GAME CONTROLLER BODY", which is incorporated herein by reference. The console 110 may include a microphone array 118 and the controller 110 may also include an acoustic signal generator 210 (e.g., a speaker) to provide a source of sound to facilitate acoustic tracking of the controller 110 with the microphone array 118 and appropriate acoustic signal processing, e.g., as described in U.S. patent application Ser. No. 11/381,724, which is incorporated herein by reference.

As shown in FIG. 2, the controller may optionally be equipped with light sources such as light emitting diodes (LEDs) 202, 204, 206, 208 to facilitate tracking by video analysis. Analysis of such video images for the purpose of tracking the controller 110 are described, e.g., in U.S. patent application Ser. No. 11/382,034, entitled "SCHEME FOR DETECTING AND TRACKING USER MANIPULATION OF A GAME CONTROLLER BODY", which is incorporated herein by reference. The console 110 may include a microphone array 118 and the controller 110 may also include an acoustic signal generator 210 (e.g., a speaker) to provide a source of sound to facilitate acoustic tracking of the controller 110 with the microphone array 118 and appropriate acoustic signal processing, e.g., as described in U.S. patent application Ser. No. 11/381,724, which is incorporated herein by reference.

In general, signals from the inertial sensor 112 are used to generate position and orientation data for the controller 110. Such data may be used to calculate many physical aspects of the movement of the controller 110, such as for example its acceleration and velocity along any axis, its tilt, pitch, yaw, roll, as well as any telemetry points of the controller 110. As used herein, telemetry generally refers to remote measurement and reporting of information of interest to a system or to the system's designer or operator.

The ability to detect and track the movements of the controller 110 makes it possible to determine whether any predefined movements of the controller 110 are performed. That is, certain movement patterns or gestures of the controller 110 may be predefined and used as input commands for the game or other simulation. For example, a plunging downward gesture of the controller 110 may be defined as one command, a twisting gesture of the controller 110 may be defined as another command, a shaking gesture of the controller 110 may be defined as another command, and so on. In this way the manner in which the user 108 physically moves the controller 110 is used as another input for controlling the game, which provides a more stimulating and entertaining experience for the user.

By way of example and without limitation, the inertial sensor 112 may be an accelerometer. FIG. 3A depicts an example of an accelerometer 300 in the form of a simple mass 302 elastically coupled at four points to a frame 304, e.g., by springs 306, 308, 310, 312. Pitch and roll axes (indicated by X and Y, respectively) lie in a plane that intersects the frame. A yaw axis Z is oriented perpendicular to the plane containing the pitch axis X and the roll axis Y. The frame 304 may be mounted to the controller 110 in any suitable fashion. As the frame 304 (and the joystick controller 110) accelerates and/or rotates the mass 302 may displace relative to the frame 304 and the springs 306, 208, 310, 312 may elongate or compress in a way that depends on the amount and direction of translational and/or rotational acceleration and/or the angle of pitch and/or roll and/or yaw. The displacement and of the mass 302 and/or compression or elongation of the springs 306, 308, 310, 312 may be sensed, e.g., with appropriate sensors 314, 316, 318, 320 and converted to signals that depend in known or determinable way on the amount acceleration of pitch and/or roll.

There are a number of different ways to track the position of the mass and/or or the forces exerted on it, including resistive strain gauge material, photonic sensors, magnetic sensors, hall-effect devices, piezoelectric devices, capacitive sensors, and the like. Embodiments of the invention may include any number and type or combination of types of sensors. By way of example, and without limitation, the sensors 314, 316, 318, 320 may be gap closing electrodes placed above the mass 302. A capacitance between the mass and each electrode changes as the position of the mass changes relative to each electrode. Each electrode may be connected to a circuit that produce a signal related to the capacitance (and therefore to the proximity) of the mass 302 relative to the electrode. In addition, the springs 306, 308, 310, 312 may include resistive strain gauge sensors that produce signals that are related to the compression or elongation of the springs.

In some embodiments, the frame 304 may be gimbal mounted to the controller 110 so that the accelerometer 300 maintains a fixed orientation with respect to the pitch and/or roll and/or yaw axes. In such a manner, the controller axes X, Y, Z may be directly mapped to corresponding axes in real space without having to take into account a tilting of the controller axes with respect to the real space coordinate axes.

Figure 3B:
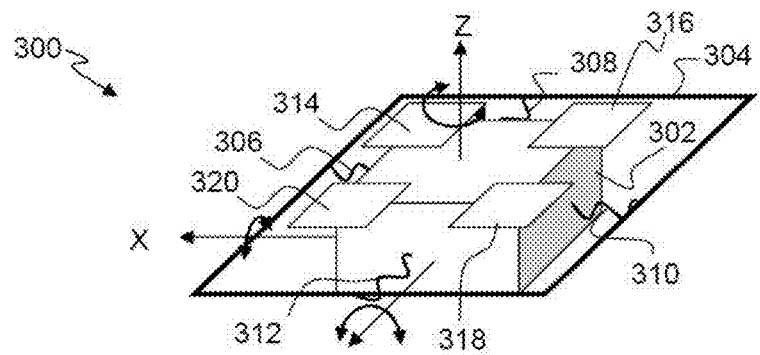
FIG. 3B is a cross-sectional schematic diagram illustrating the accelerometer of FIG. 3A in a state of rotation about a pitch or roll axis.
Figure 3B:
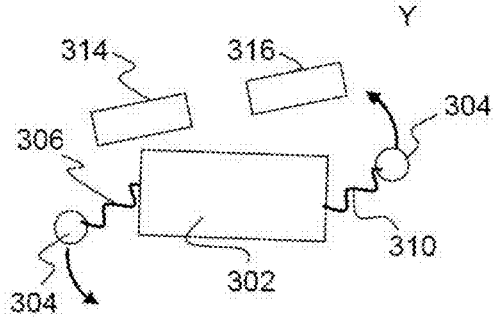
Figure 3C:
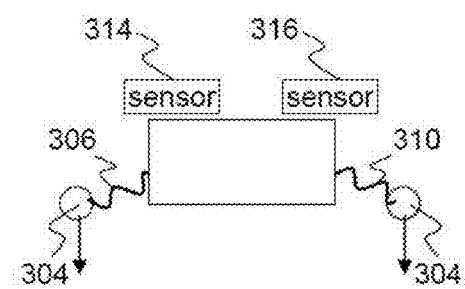
FIG. 3C is a cross-sectional schematic diagram illustrating the accelerometer of FIG. 3A in a state of translational acceleration.
Figure 3D:
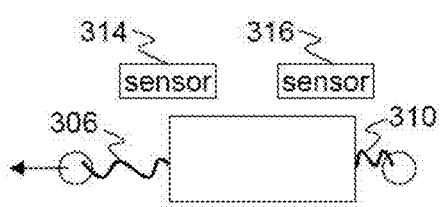
FIG. 3D is a top plan view schematic diagram illustrating the accelerometer of FIG. 3A in a state of rotational acceleration about a yaw axis.
Figure 3E:
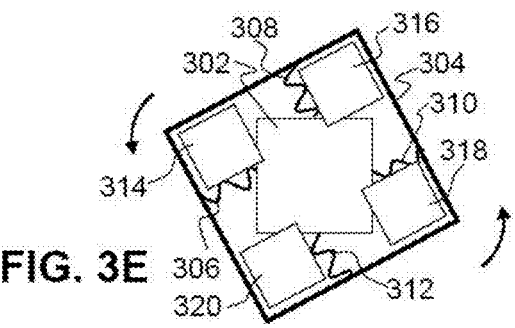
FIG. 3E is a top plan view schematic diagram illustrating the accelerometer of FIG. 3A in a state of rotational acceleration about a yaw axis.

FIGS. 3B-3D illustrate examples of different elongation and compressions for the springs 306, 308, 310, 312 under different conditions of acceleration and/or rotation. Specifically, FIG. 3B depicts a situation wherein the frame 304 has been rotated about the Y axis. Due to the force of gravity acting the mass 302, the springs 306, 310 are elongated and the mass 302 is brought closer to sensors 314, 318 and further away from sensors 316, 320. Rotation about the Y (roll) axis in the opposite sense would similarly elongate the springs 306, 310, but would bring the mass closer to sensors 316, 320 and further from sensors 314, 318. Similarly, rotation about the X (pitch) axis could elongate springs 308, 312 and bring the mass closer to sensors 314, 316 and further from sensors 318, 320, depending on the direction of rotation.

FIG. 3C depicts a situation in which the frame 304 has been accelerated sharply downwards (as indicated by the arrows) while remaining level. In this situation all four springs 306, 308, 310, 312 elongate and the mass is brought closer to all four sensors 314, 316, 318, 320. In FIG. 3D the frame 304 is accelerated to the left (as indicated by the arrow) while remaining level. In this situation, springs 306, 308, and 312 elongate while spring 310 is compressed. The mass 302 moves away from sensors 314, 318 and closer to sensors 316, 320. FIG. 3D depicts a situation in which the frame 304 has been given an angular acceleration about the Z (yaw) axis produces an elongation of all four springs 306, 308, 310, 312 and moves the mass 302 away from all four sensors 314, 316, 318, 320. As may be seen from FIGS. 3B-3E, different motions and/or orientations of the frame 304 therefore produce particular combinations of signals that may be analyzed to determine the orientation and/or motion of the frame 304 (and the controller 110).

In the absence of external forces acting on the mass 302 the displacement of the mass 302 from a rest position along the Z axis is roughly proportional to the amount of acceleration along the Z axis. The detectors 314, 316, 318, 320 produce signals that are proportional to the displacement of the mass 302 and are, therefore, proportional to the acceleration of the frame 304 (and controller 110) along the Z axis. In a similar fashion, signals from the sensors may be used to deduce acceleration along the X and Y axes. It is noted that, in the force of gravity may act on the mass 302 and the sensors 314, 316, 318, 320 may produce non-zero signals. For example in a rest state, with no pitch or roll applied to the joystick controller, the Z axis may be aligned with the vertical axis (as determined by the force of gravity). Gravity may displace the mass 302, from a position it would otherwise have assumed in the absence of gravity. As a result the displacement sensors produce some non-zero signal $V_0$, which is referred to herein as a "zero-point" acceleration signal. The zero-point acceleration signal $V_0$ is typically subtracted from the accelerometer signal V before analyzing the raw signals from the sensors 314, 316, 318, 320.

Figure 4:
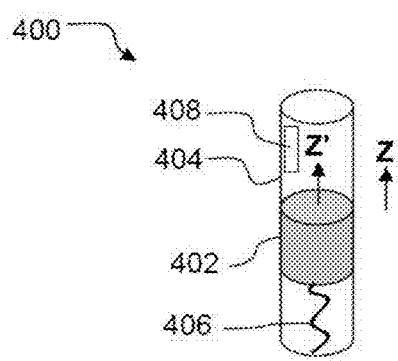
FIG. 4 is a three-dimensional schematic diagram illustrating correction of an orientation dependent zero-point accelerometer signal in accordance with an embodiment of the present invention.
Figure 4:
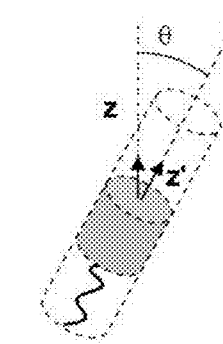

If the frame 304 (and the controller 110) remains in the same orientation with respect to pitch and roll the zero-point acceleration signal $V_0$ is constant. However, the zero-point acceleration signal $V_0$ may be dependent on the amount of rotation about the pitch and roll axes. Embodiments of the present invention may take into account the effects of pitch and roll on the zero-point acceleration signal $V_0$. For example, FIG. 4 illustrates the situation with respect to a single axis accelerometer 400 having a mass 402 constrained to move in a tube 404 along a tube axis Z. A spring 406 connects the mass 404 to an end-cap of the tube 404. A sensor 408, e.g., a capacitance sensor as described above. If the tube axis Z is tilted (as shown in phantom) with respect to a vertical direction Z' by an angle θ due to pitch and roll of the tube 404, a "rotated" zero-point acceleration signal $V_0'$ may be expected to be related to $V_0$ and θ as:

$$V_0' = V_0 \cos \theta.$$

Note that in the extreme case of θ=90 degrees, $V_0'=0$.

The angle θ generally depends on the angles of pitch and roll. These may be determined from signals from separate sensors. A unit vector z directed along the tube axis Z may be constructed from known absolute values of pitch and roll relative to a known initial orientation, e.g., one in which the accelerometer axis is aligned with a unit vector z' directed along the vertical axis. It is noted that the initial orientation may be any orientation of the joystick controller that produces a stable signal from the accelerometer 400. A dot product between the unit vectors z and z' gives the cosine of the angle θ between them. This dot product may be multiplied by the zero-point signal $V_0$ to provide the desired correction factor, which may then be subtracted from the acceleration signal obtained from the sensor 408.

It is noted that in embodiments of the present sensor various types of inertial sensor devices may be used to provide information on 6-degrees of freedom (e.g., X, Y and Z translation and rotation about X, Y and Z axes). Examples of suitable inertial sensors for providing information on 6-degrees of freedom include accelerometers of the type shown in FIG. 3A, one or more single axis accelerometers, mechanical gyroscopes, ring laser gyroscopes or combinations of two or more of these.

Figure 5A:
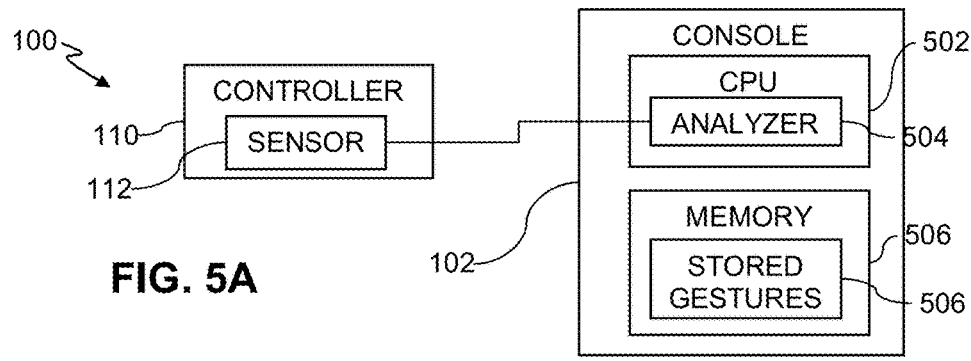
FIG. 5A is a block diagram of a portion of the video game system of FIG. 1A.

Signals from the sensor may be analyzed to determine the motion and/or orientation of the controller during play of a video game according to an inventive method. Such a method may be implemented as a series of processor executable program code instructions stored in a processor readable medium and executed on a digital processor. For example, as depicted in FIG. 5A, the video game system 100 may include on the console 102 a processor 502. The processor may be any suitable digital processor unit, e.g., a microprocessor of a type commonly used in video game consoles. The processor may implement an inertial analyzer 504 through execution of processor readable instructions. A portion of the instructions may be stored in a memory 506. Alternatively, the inertial analyzer 504 may be implemented in hardware, e.g., as an application specific integrated circuit (ASIC). Such analyzer hardware may be located on the controller 110 or on the console 102 or may be remotely located elsewhere. In hardware implementations, the analyzer 504 may be programmable in response to external signals e.g., from the processor 502 or some other remotely located source, e.g., connected by USB cable, wireless connection, or over a network.

The inertial analyzer 504 may include or implement instructions that analyze the signals generated by the inertial sensor 112 and utilize information regarding position and/or orientation of the controller 110. For example, as shown in the flow diagram 510 of FIG. 5B signals may be generated by the inertial sensor 112 as indicated at block 512. The inertial sensor signals may be analyzed to determine information regarding the position and/or orientation of the controller 110 as indicated at block 514. The position and or orientation information may be utilized during play of a video game with the system 100 as indicated at block 516.

In certain embodiments, the position and/or orientation information may be used in relation to gestures made by the user 108 during game play. As indicated in the flow diagram 520 of FIG. 5C, a path of the controller 110 may be tracked using the position and/or orientation information as indicated at block 522. By way of example, and without limitation, the path may include a set of points representing a position of the center of mass of the controller with respect to some system of coordinates. Each position point may be represented by one or more coordinates, e.g., X, Y and Z coordinates in a Cartesian coordinate system. A time may be associated with each point on the path so that both the shape of the path and the progress of the controller along the path may be monitored. In addition, each point in the set may have associated with it data representing an orientation of the controller, e.g., one or more angles of rotation of the controller about its center of mass. Furthermore, each point on the path may have associated with it values of velocity and acceleration of the center of mass of the controller and rates of angular rotation and angular acceleration of the controller about its center of mass.

As indicated at block 524, the tracked path may be compared to one or more stored paths corresponding to known and/or pre-recorded gestures 508 that are relevant to the context of the video game being played. The analyzer 504 may be configured to recognize a user or process audio authenticated gestures, etc. For example, a user may be identified by an the analyzer 504 through a gesture and that a gesture may be specific to a user. Such a specific gestures may be recorded and included among the pre-recorded gestures 508 stored in memory 506. The recordation process may optionally store audio generated during recordation of a gesture. The sensed environment is sampled into a multi-channel analyzer and processed. The processor may reference gesture models to determine and authenticate and/or identify a user or objects based on voice or acoustic patterns and to a high degree of accuracy and performance.

As indicated in FIG. 5A, the gestures may be stored in the memory 506. Examples of gestures include, but are not limited to throwing an object such as a ball, swinging an object such as a bat or golf club, pumping hand pump, opening or closing a door or window, turning steering wheel or other vehicle control, martial arts moves such as punches, sanding movements, wax on wax off, paint the house, shakes, rattles, rolls, football pitches, turning knob movements, 3D MOUSE movements, scrolling movements, movements with known profiles, any recordable movement, movements along any vector back and forth i.e. pump the tire but at some arbitrary orientation in space, movements along a path, movements having precise stop and start times, any time based user manipulation that can be recorded, tracked and repeated within the noise floor, splines, and the like. Each of these gestures may be pre-recorded from path data and stored as a time-based model. Comparison of the path and stored gestures may start with an assumption of a steady state if the path deviates from a steady state the path can be compared to the stored gestures by a process of elimination. If at block 526 there is no match, the analyzer 504 may continue tracking the path of the controller 110 at block 522. If there is a sufficient match between the path (or a portion thereof) and a stored gesture the state of the game may be changed as indicated at 528. Changes of state of the game may include, but are not limited to interrupts, sending control signals, changing variables, etc.

Here is one example of this can occur. Upon determining that the controller 110 has left a steady state the path the analyzer 504 tracks movement of the controller 110. As long as the path of the controller 110 complies with a path defined in the stored gesture models 508, those gestures are possible "hits". If the path of the controller 110 deviates (within the noise tolerance setting) from any gesture model 508, that gesture model is removed from the hit list. Each gesture reference model includes a time-base in which the gesture is recorded. The analyzer 502 compares the controller path data to the stored gestures 508 at the appropriate time index. Occurrence of a steady state condition resets the clock. When deviating from steady state (i.e. when movements are tracked outside of the noise threshold) the hit list is populated with all potential gesture models. The clock is started and movements of the controller are compared against the hit list. Again, the comparison is a walk through time. If any gesture in the hit list reaches the end of the gesture then it is a hit.

In certain embodiments, the analyzer 504 may inform a game program when certain events occur. Examples of such events include the following:

INTERRUPT ZERO-ACCELERATION POINT REACHED (X AND/OR Y AN/OR Z AXIS) In certain game situations the analyzer 504 may notify or interrupt routine within the game program when acceleration of the controller changes at the inflection points. For example, the user 108 may use the controller 110 to control a game avatar representing a quarterback in a football simulation game. The analyzer 504 may track the controller (representing the football) via a path generated from signals from the inertial sensor 112. A particular change in acceleration of the controller 110 may signal release of the football. At this point, the analyzer may trigger another routine within the program (e.g., a physics simulation package) to simulate the trajectory of the football based on the position, and/or velocity and/or orientation of the controller at the point of release.

Interrupt New Gesture Recognized

In addition, the analyzer 502 may be configured by one or more inputs. Examples of such inputs include, but are not limited to:

SET NOISE LEVEL (X,Y or Z AXIS) The noise level may be a reference tolerance used when analyzing jitter of the user's hands in the game.

SET SAMPLING RATE. As used herein, the sampling rate may refer to how often the analyzer 502 samples the signals from the inertial sensor. The sampling rate may be set to oversample or average the signal.

SET GEARING. As used herein gearing generally refers to the ratio of controller movements to movements occurring within the game. Examples of such "gearing" in the context of control of a video game may be found in U.S. patent application Ser. No. 11/382,036, filed May 6, 2006, published as US Patent Application Publication 2006/0252541, which is incorporated herein by reference.

SET MAPPING CHAIN. As used herein, a mapping chain refers to a map of gesture models. The gesture model maps can be made for a specific input Channel (e.g., for path data generated from inertial sensor signals only) or for a hybrid Channel formed in a mixer unit. Three input Channels may be served by two or more different Analyzers that are similar to the inertial analyzer 504. Specifically, these may include: the inertial analyzer 504 as described herein, a video analyzer as described e.g., in U.S. patent application Ser. No. 11/382,034 entitled SCHEME FOR DETECTING AND TRACKING USER MANIPULATION OF A GAME CONTROLLER BODY, which is incorporated herein by reference, and an Acoustic Analyzer, e.g., as described in U.S. patent application Ser. No. 11/381,721, which is incorporated herein by reference. The Analyzers can be configured with a mapping chain. Mapping chains can be swapped out by the game during gameplay as can settings to the Analyzer and to the Mixer.

Referring to again to FIG. 5A, block 502, those of skill in the art will recognize that there are numerous ways to generate signals from the inertial sensor 112. A few examples, among others have been described above with respect to FIGS. 3A-3E. Referring to block 504, there are numerous ways to analyze the sensor signals generated in block 502 to obtain information relating to the position and/or orientation of the controller 110. By way of example and without limitation the position and/or orientation information may include, but is not limited to information regarding the following parameters individually or in any combination:

CONTROLLER ORIENTATION. Orientation of the controller 110 may be expressed in terms of pitch, roll or yaw angle with respect to some reference orientation, e.g., in radians). Rates of change of controller orientation (e.g., angular velocities or angular accelerations) may also be included in the position and/or orientation information. Where the inertial sensor 112 includes a gyroscopic sensor controller orientation information may be obtained directly in the form of one or more output values that are proportional to angles of pitch, roll or yaw.

CONTROLLER POSITION (e.g., Cartesian coordinates X, Y, Z of the controller 110 in some frame of reference)

CONTROLLER X-AXIS VELOCITY

CONTROLLER Y-AXIS VELOCITY

CONTROLLER Z-AXIS VELOCITY

CONTROLLER X-AXIS ACCELERATION

CONTROLLER Y-AXIS ACCELERATION

CONTROLLER Z-AXIS ACCELERATION

It is noted that with respect to position, velocity and acceleration the position and/or orientation information may be expressed in terms of coordinate systems other than Cartesian. For example, cylindrical or spherical coordinates may be used for position, velocity and acceleration. Acceleration information with respect to the X, Y and Z axes may be obtained directly from an accelerometer type sensor, e.g., as described above with respect to FIGS. 3A-3E. The X, Y and Z accelerations may be integrated with respect to time from some initial instant to determine changes in X, Y and Z velocities. These velocities may be computed by adding the velocity changes to known values of the X-, Y-, and Z-velocities at the initial instant in time. The X, Y and Z velocities may be integrated with respect to time to determine X-, Y-, and Z-displacements of the controller. The X-, Y-, and Z-positions may be determined by adding the displacements to known X-, Y-, and Z-, positions at the initial instant.

STEADY STATE Y/N—This particular information indicates whether the controller is in a steady state, which may be defined as any position, which may be subject to change too. In a preferred embodiment the steady state position may be one wherein the controller is held in a more or less level orientation at a height roughly even with a user's waist.

TIME SINCE LAST STEADY STATE generally refers to data related to how long a period of time has passed since a steady state (as referenced above) was last detected. That determination of time may, as previously noted, be calculated in real-time, processor cycles, or sampling periods. The Time Since Last Steady State data time may be important with regard to resetting tracking of a controller with regard to an initial point to ensure accuracy of character or object mapping in a game environment. This data may also be important with regard to determining available actions/gestures that might be subsequently executed in a game environment (both exclusively and inclusively).

LAST GESTURE RECOGNIZED generally refers to the last gesture recognized either by a gesture recognition engine (which may be implemented in hardware or software. The identification of a last gesture recognized may be important with respect to the fact that a previous gesture may be related to the possible gestures that may be subsequently recognized or some other action that takes place in the game environment.

Time Last Gesture Recognized

The above outputs can be sampled at any time by a game program or software.

The technology described herein can be used to provide actively geared inputs for an interaction with a computer program. Gearing, in the general and broadest sense, can be defined an input that can have varying degrees in magnitude and/or time. The degree of gearing can then be communicated to a computing system. The degree of gearing may be applied to a process executed by the computing system. By analogy, a process can be imaged as a bucket of fluid having an input and an output. The bucket of fluid is a process that is executing on a system, and the gearing therefore controls an aspect of the processing performed by the computing system. In one example, the gearing can control the rate at which the fluid is emptied from the fluid bucket relative to an input amount, which might be thought of as drops of fluid going into the bucket. Thus, the fill rate may be dynamic, the drain rate may be dynamic, and the drain rate might be impacted by the gearing. The gearing can thus be adjusted or timed so as to tune a changing value that may be streaming to a program, such as a game program. The gearing may also impact a counter, such as a moving data counter that then controls an action by a processor or eventually a game element, object, player, character, etc.

Taking this analogy to a more tangible computing example, the rate at which the fluid is emptied might be the rate at which control is passed to or executed by a feature of a computer program, in response to some input plus gearing. The feature of the computer program may be an object, a process, a variable, or predefined/custom algorithm, character, game player, mouse (2D or 3D), etc. The result of the processing, which may have been altered by the gearing, can be conveyed to an observer in any number of ways. One way may be visually on a display screen, audibly via sound, vibration acoustics via feel, a combination thereof, etc., or simply by the modified response of processing for an interactive element of a game or program.

The input can be obtained by tracking performed via: (1) an image analysis, (2) an inertial analysis, (3) acoustic analysis, or hybrid Mixed analysis of (1), (2) or (3). Various examples are provided regarding image analysis and applied gearing, but it should be understood that the tracking is not limited to video, but can accomplished by numerous ways, and in particular, by inertial analysis, acoustic analysis, mixtures of these and other suitable analyzers.

In various embodiments, a computer or gaming system having a video camera (e.g., image analysis) can process image data and identify various actions taking place in a zone of focus or given volume that may be in front of the video camera. Such actions typically include moving or rotating the object in three dimensional space or actuating any of a variety of controls such as buttons, dials, joysticks, etc. In addition to these techniques, the present technology further provides the additional functionality of adjusting a scaling factor, referred to herein as gearing, to adjust the sensitivity of the input with respect to one or more corresponding actions on a display screen or a feature of a program. For instance, the actions on the display screen may be of an object that may be the focus of a video game. The object may also be a feature of a program, such as a variable, a multiplier, or a computation that will then be rendered as sound, vibration, images on a display screen or a combination of the these and other representations of the geared output.

Gearing can be applied to a feature of a computer program, and detection of an input device can be based on processing by an inertial analyzer. The inertial analyzer will track an input device for inertial activity, and the inertial analyzer can then convey the information to a program. The program will then take the output from the inertial analyzer so that a gearing amount can be applied to the output. The gearing amount will then dictate a degree or ratio by which a program will compute an operation. The operation can take on any number of forms, and one example of the operation can be to generate a noise, a variable noise, vibration, a movement by an object, or computation by a program that then outputs a visible and/or audible result. If the output is a variable, the variable may be used to complete the execution of a process, such that the process will take into account the amount of gearing. The amount of gearing can be preset, set dynamically by the user or adjusted on demand. The ratio can be dynamically changed during game play, before a game play session or during certain action events during a game.

Figure 7:
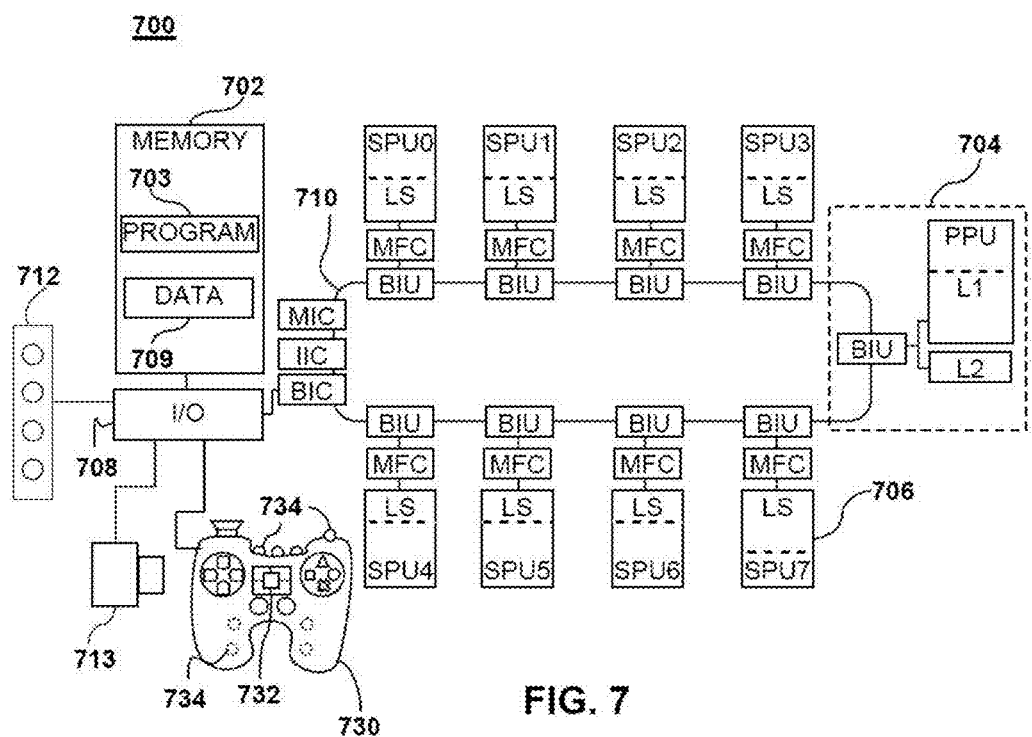
FIG. 7 is a block diagram of a cell processor implementation of the video game system according to an embodiment of the present invention.
Figure 8:
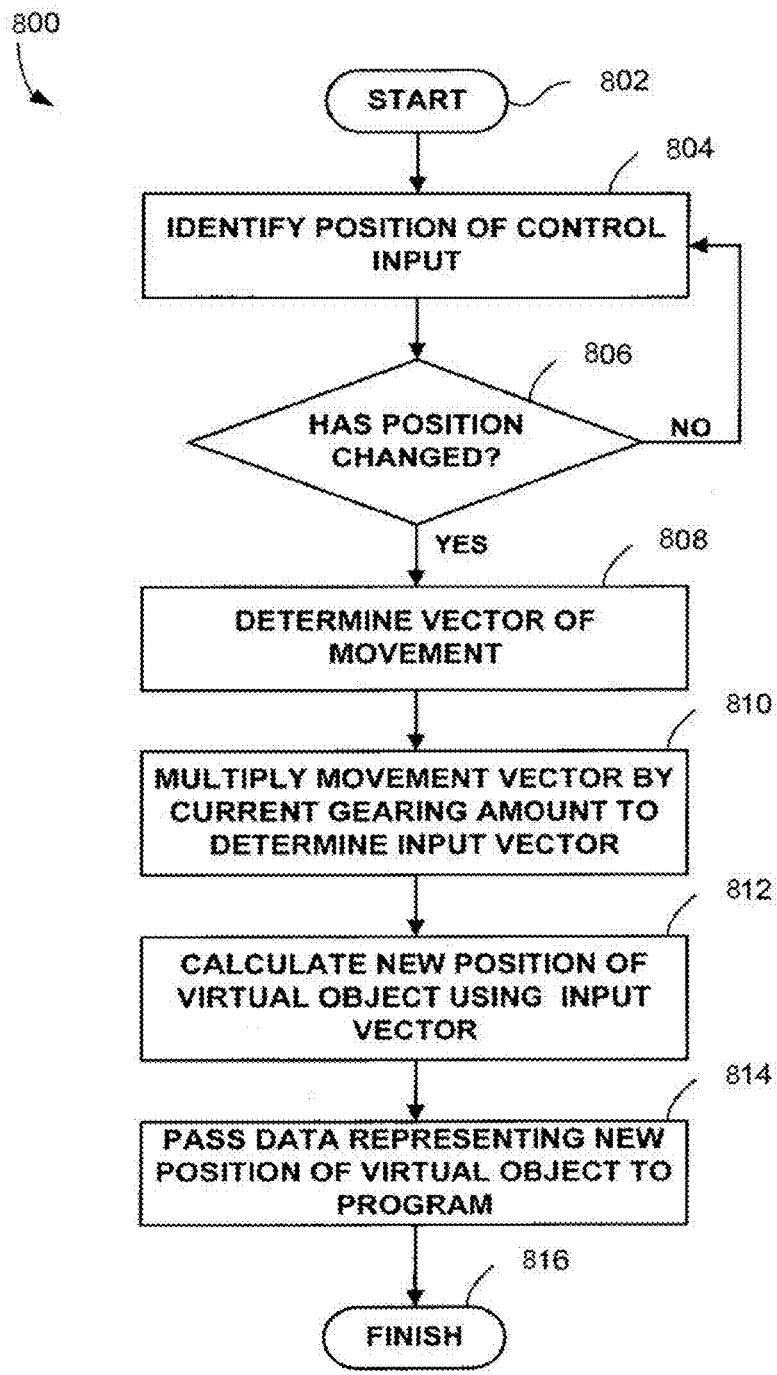
FIG. 8 shows a flowchart describing an exemplary procedure for receiving user input to computer program.

FIG. 8 shows a flowchart 800 describing an exemplary procedure for receiving user input for the computer program. The procedure begins as indicated by start block 802 and proceeds to operation 804 wherein a position of a control input is identified. The control input may be the position of an input object in a three dimensional space as described above with reference to FIG. 7 of US Patent Application Publication 20060252541, or the position of a user interface device as described with reference to FIG. 14 of US Patent Application Publication 20060252541. The position may be expressed as a representative value, or a plurality of values, such as a vector. After identifying the position of the control input, the procedure flows to operation 806.

In operation 806, a determination is made as to whether the position has changed. If the position has not changed, then the procedure returns to operation 804. In one embodiment, operation 804 is delayed until a new frame of image data is received from the image capture device. If, at operation 806, it is determined that the position has changed, then the procedure flows to operation 808.

In operation 808, a vector of movement is calculated. The movement vector can be any number of dimensions. For example, if the movement is of an input object in three-dimensional space, the movement vector may describe the movement as a three dimensional vector. However, if the movement is of a one dimensional control input, such as a steering wheel, then the movement vector is a one dimensional vector that describes the amount of rotation of the steering wheel. After determining the movement vector the procedure flows to operation 810.

In operation 810, the movement vector is multiplied by a current gearing amount to determine an input vector. The current gearing amount may be a scalar quantity or a multidimensional value. If it is a scalar quantity, then all dimensions of the movement vector are multiplied by the same amount. If the gearing amount is multidimensional, then each dimension of the movement vector is multiplied by a corresponding dimension of the gearing amount. The gearing amount may vary in response to user input and may be under software control. Therefore, the current gearing amount may change from moment to moment. After multiplying the movement vector by the current gearing amount, the procedure flows to operation 812.

In operation 812, a new position of a virtual object is calculated using the input vector calculated in operation 810. The new position may be a camera position, or an object position such as a virtual steering wheel. The virtual object may not be displayed on a display screen. Once the new position of the virtual object is calculated, the procedure flows to operation 814 wherein data representing the new position is passed to the application program. The procedure then ends as indicated by finish block 816. It should be noted, however, that this flow is only exemplary in nature, and other alternatives may be possible.

Figure 9:
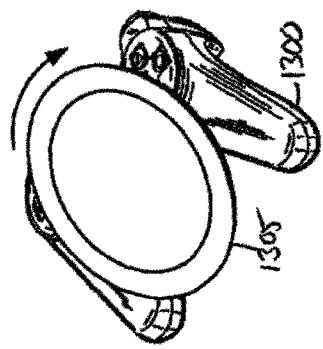
FIG. 9 shows an exemplary controller having a steering wheel.
Figure 9:
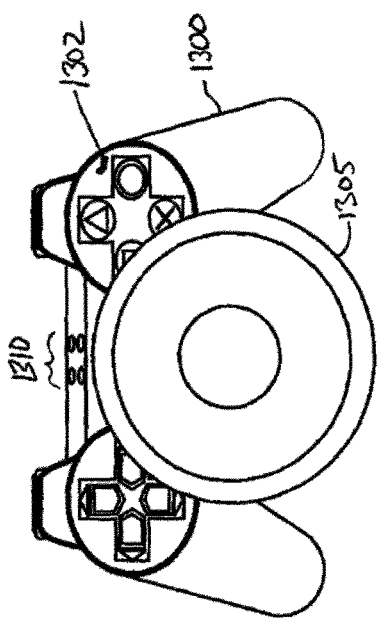

FIG. 9 shows another exemplary controller 1300 having a steering wheel 1305 which may be manipulated by a user. In this case, rotations of steering wheel 1305 and actuation of buttons of interface 1302 are interpreted by controller 1300, which generates data transmissions via LEDs 1310.

Figure 10:
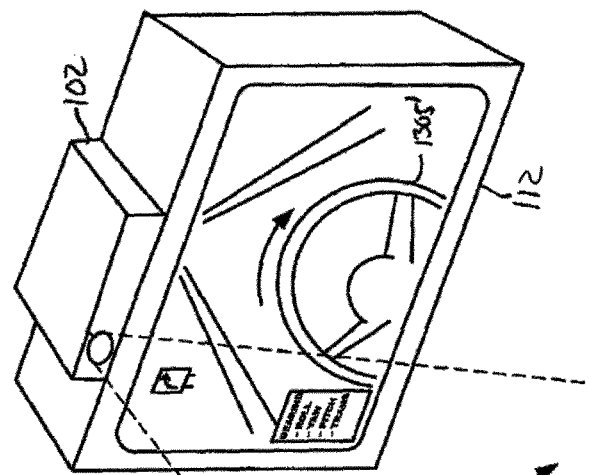
FIG. 10 shows an exemplary application for the controller of FIG. 9.
Figure 11:
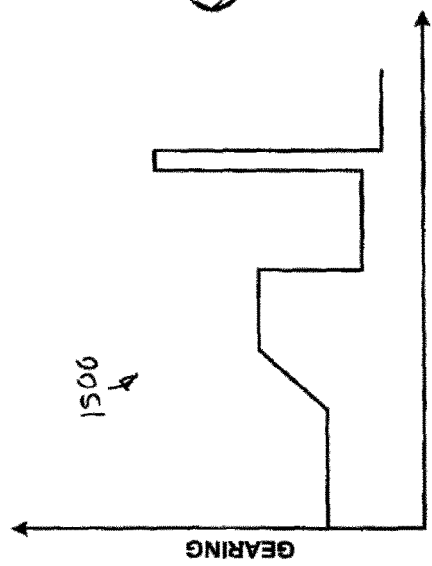
FIG. 11 shows an exemplary graph depicting exemplary changes in gearing amount over time.

FIG. 10 shows an exemplary application of controller 1300. In this example, the application is a driving simulation that receives commands issued in response to rotation of steering wheel 1305 and translates these commands as corresponding rotations of a virtual steering wheel 1305 in display 104. A gearing amount, which scales the rotation of steering wheel 1305 to a corresponding rotation of virtual steering wheel 1305' can be changed in response to user interaction with interface 1302 (FIG. 13) or in response to the software control. FIG. 11 shows an exemplary graph 1500 depicting exemplary changes in gearing amount over time. In one example, the changes in gearing can by dynamically set by the user during game play. Additionally, as shown by graph 1500, the transitions in gearing can be smooth, sharp, in steps, for longer time, shorter time, or combinations thereof. Thus, the gearing can be set or changed by the game over time during a gaming session, so as to provide a more realistic interactive experience. Additionally giving the user control of the gearing enables another dimension of control beyond predefined controls found in traditional games.

Figure 12:
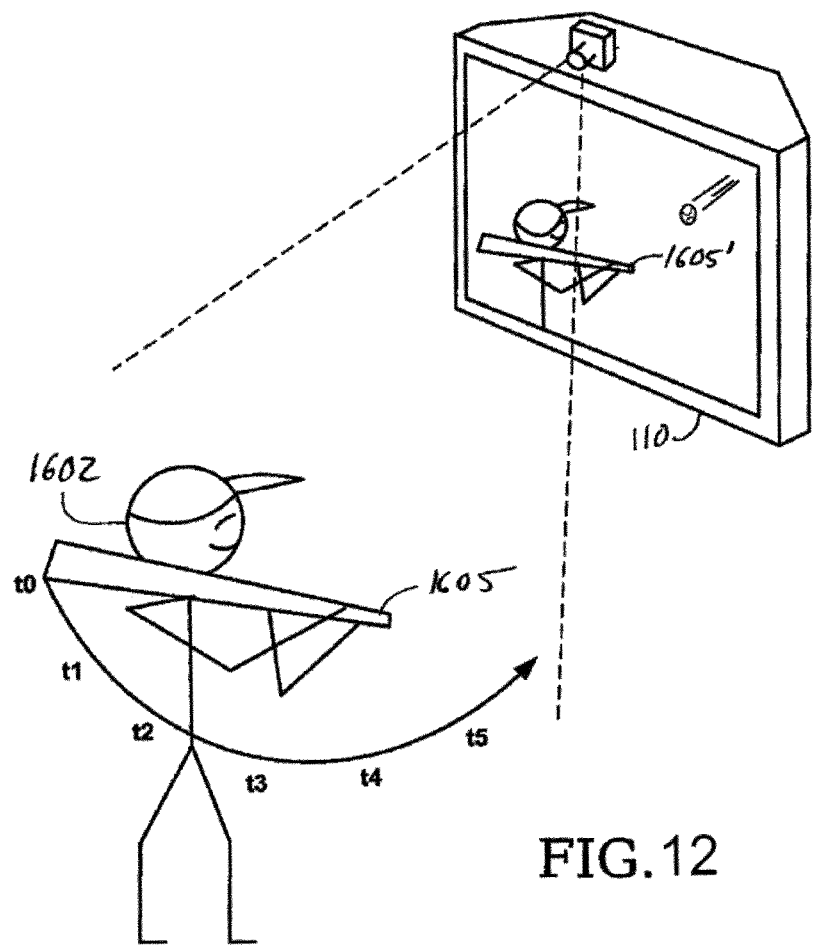
FIG. 12 shows another exemplary application of an image processing system responding to user interaction.

FIG. 12 shows another exemplary application of an image processing system responding to user interaction. In this example, a user 1602 interacts with a baseball simulation by swinging a toy baseball bat 1605 which may be recognized by the image processing system as an input object. As the toy baseball bat is swung the user and/or the software can control the gearing amount to manipulate the speed or distance of virtual baseball bat 1605'. In one embodiment, the bat may include a number of buttons that can be pressed during game play, and by pressing the buttons, the gearing can be made to change. In another embodiment, the user can preset or program in a combination of gearing levels that will be applied when the bat is swung.

Figure 13:
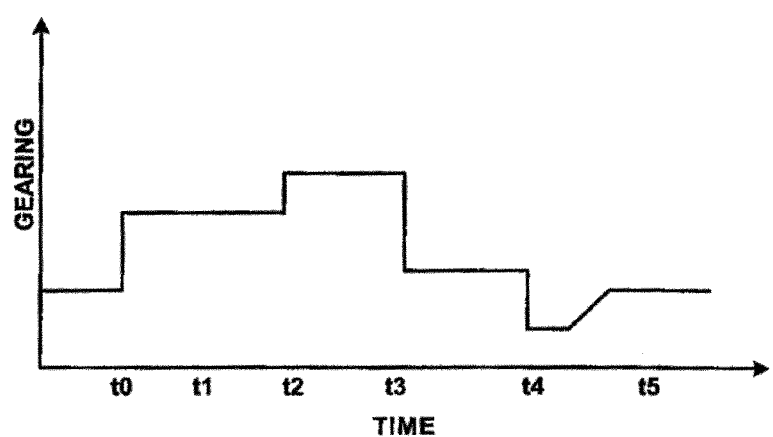
FIG. 13 shows a graph depicting an exemplary gearing amount at different times along the length of a baseball bat swing for the application shown in FIG. 12.

FIG. 13 shows graph 1700 depicting an exemplary gearing amount at different times t1-t5 along the length of the swing. These gearing amounts may have been set by the user before swinging the bat or may have been set by the game dynamically in response to the position of the bat. Again, it is shown how the gearing can be changed over time, kept constant over particular intervals, or gradually increased. In graph 1700, the gearing may have been set higher between times t2-t3, so that the swing of the bat will be more powerful when contact is made with the ball, and then the gearing is relaxed during time t3-t4 when the bat has already made contact. The different times, in one embodiment, can be estimated by the user, or determined by the computer.

In one example, the user can take a few practice swings, and then the computer can map out a number of example time slots corresponding to the user's actual swing ability. Then, the user can custom assign specific gearing to each time interval, depending on how the user wants to impact his game interactivity. Once the gearing is set, the user's movement of the bat 1605 can then be mapped to the movement of the bat 1605' (e.g., game object). Again, it should be noted that the gearing can be preset by the game during different action, set during game play by the user, and may be adjusted in real time during game play.

According to embodiments of the present invention, a video game system and method of the type described above may be implemented as depicted in FIG. 6. A video game system 600 may include a processor 601 and a memory 602 (e.g., RAM, DRAM, ROM, and the like). In addition, the video game system 600 may have multiple processors 601 if parallel processing is to be implemented. The memory 602 includes data and game program code 604, which may include portions that are configured as described above. Specifically, the memory 602 may include inertial signal data 606 which may include stored controller path information as described above. The memory 602 may also contain stored gesture data 608, e.g., data representing one or more gestures relevant to the game program 604.

Figure 6:
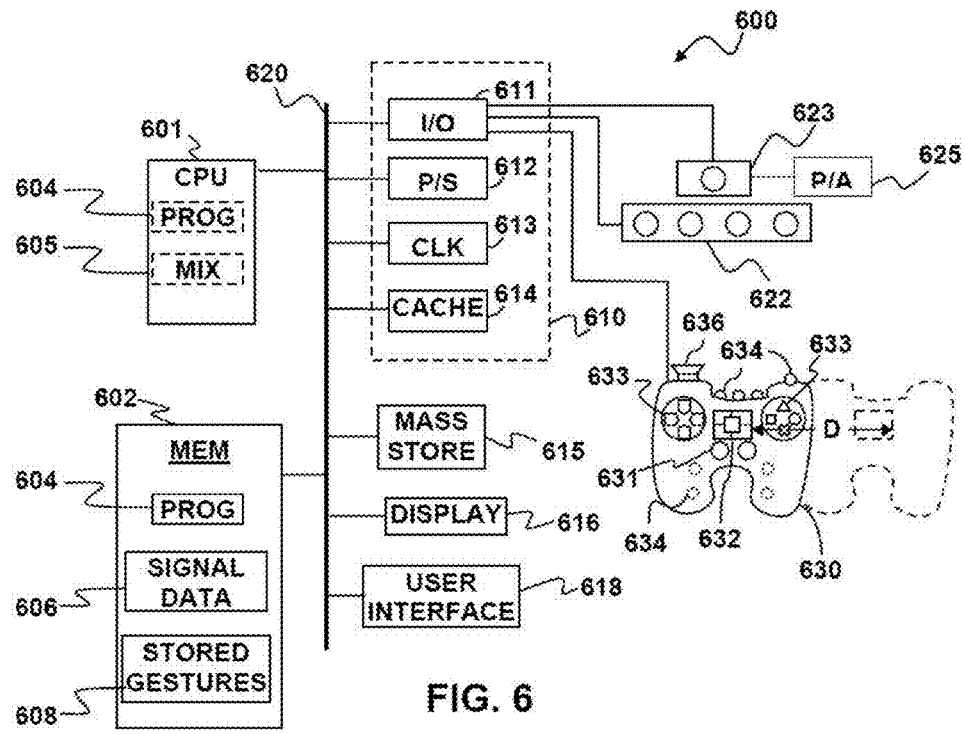
FIG. 6 is a block diagram illustrating a video game system according to an embodiment of the present invention.

The system 600 may also include well-known support functions 610, such as input/output (I/O) elements 611, power supplies (P/S) 612, a clock (CLK) 613 and cache 614. The apparatus 600 may optionally include a mass storage device 615 such as a disk drive, CD-ROM drive, tape drive, or the like to store programs and/or data. The controller may also optionally include a display unit 616 and user interface unit 618 to facilitate interaction between the controller 600 and a user. The display unit 616 may be in the form of a cathode ray tube (CRT) or flat panel screen that displays text, numerals, graphical symbols or images. The user interface 618 may include a keyboard, mouse, joystick, light pen or other device. In addition, the user interface 618 may include a microphone, video camera or other signal transducing device to provide for direct capture of a signal to be analyzed. The processor 601, memory 602 and other components of the system 600 may exchange signals (e.g., code instructions and data) with each other via a system bus 620 as shown in FIG. 6.

A microphone array 622 may be coupled to the system 600 through the I/O functions 611. The microphone array may include between about 2 and about 8 microphones, preferably about 4 microphones with neighboring microphones separated by a distance of less than about 4 centimeters, preferably between about 1 centimeter and about 2 centimeters. Preferably, the microphones in the array 622 are omni-directional microphones. An optional image capture unit 623 (e.g., a digital camera) may be coupled to the apparatus 600 through the I/O functions 611. One or more pointing actuators 625 that are mechanically coupled to the camera may exchange signals with the processor 601 via the I/O functions 611.

As used herein, the term I/O generally refers to any program, operation or device that transfers data to or from the system 600 and to or from a peripheral device. Every data transfer may be regarded as an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, microphone, game controller, camera, external Zip drive or scanner as well as internal devices, such as a CD-ROM drive, CD-R drive or internal modem or other peripheral such as a flash memory reader/writer, hard drive.

In certain embodiments of the invention, the apparatus 600 may be a video game unit, which may include a controller 630 coupled to the processor via the I/O functions 611 either through wires (e.g., a USB cable) or wirelessly. The controller 630 may have analog joystick controls 631 and conventional buttons 633 that provide control signals commonly used during playing of video games. Such video games may be implemented as processor readable data and/or instructions from the program 604 which may be stored in the memory 602 or other processor readable medium such as one associated with the mass storage device 615.

The joystick controls 631 may generally be configured so that moving a control stick left or right signals movement along the X axis, and moving it forward (up) or back (down) signals movement along the Y axis. In joysticks that are configured for three-dimensional movement, twisting the stick left (counter-clockwise) or right (clockwise) may signal movement along the Z axis. These three axis—X Y and Z—are often referred to as roll, pitch, and yaw, respectively, particularly in relation to an aircraft.

In addition to conventional features, the controller 630 may include one or more inertial sensors 632, which may provide position and/or orientation information to the processor 601 via an inertial signal. Orientation information may include angular information such as a tilt, roll or yaw of the controller 630. By way of example, the inertial sensors 632 may include any number and/or combination of accelerometers, gyroscopes or tilt sensors. In a preferred embodiment, the inertial sensors 632 include tilt sensors adapted to sense orientation of the joystick controller with respect to tilt and roll axes, a first accelerometer adapted to sense acceleration along a yaw axis and a second accelerometer adapted to sense angular acceleration with respect to the yaw axis. An accelerometer may be implemented, e.g., as a MEMS device including a mass mounted by one or more springs with sensors for sensing displacement of the mass relative to one or more directions. Signals from the sensors that are dependent on the displacement of the mass may be used to determine an acceleration of the joystick controller 630. Such techniques may be implemented by instructions from the game program 604 which may be stored in the memory 602 and executed by the processor 601.

By way of example an accelerometer suitable as the inertial sensor 632 may be a simple mass elastically coupled at three or four points to a frame, e.g., by springs. Pitch and roll axes lie in a plane that intersects the frame, which is mounted to the joystick controller 630. As the frame (and the joystick controller 630) rotates about pitch and roll axes the mass will displace under the influence of gravity and the springs will elongate or compress in a way that depends on the angle of pitch and/or roll. The displacement and of the mass can be sensed and converted to a signal that is dependent on the amount of pitch and/or roll. Angular acceleration about the yaw axis or linear acceleration along the yaw axis may also produce characteristic patterns of compression and/or elongation of the springs or motion of the mass that can be sensed and converted to signals that are dependent on the amount of angular or linear acceleration. Such an accelerometer device can measure tilt, roll angular acceleration about the yaw axis and linear acceleration along the yaw axis by tracking movement of the mass or compression and expansion forces of the springs. There are a number of different ways to track the position of the mass and/or or the forces exerted on it, including resistive strain gauge material, photonic sensors, magnetic sensors, hall-effect devices, piezoelectric devices, capacitive sensors, and the like.

In addition, the joystick controller 630 may include one or more light sources 634, such as light emitting diodes (LEDs). The light sources 634 may be used to distinguish one controller from the other. For example one or more LEDs can accomplish this by flashing or holding an LED pattern code. By way of example, 5 LEDs can be provided on the joystick controller 630 in a linear or two-dimensional pattern. Although a linear array of LEDs is preferred, the LEDs may alternatively, be arranged in a rectangular pattern or an arcuate pattern to facilitate determination of an image plane of the LED array when analyzing an image of the LED pattern obtained by the image capture unit 623. Furthermore, the LED pattern codes may also be used to determine the positioning of the joystick controller 630 during game play. For instance, the LEDs can assist in identifying tilt, yaw and roll of the controllers. This detection pattern can assist in providing a better user/feel in games, such as aircraft flying games, etc. The image capture unit 623 may capture images containing the joystick controller 630 and light sources 634. Analysis of such images can determine the location and/or orientation of the joystick controller. Such analysis may be implemented by program code instructions 604 stored in the memory 602 and executed by the processor 601. To facilitate capture of images of the light sources 634 by the image capture unit 623, the light sources 634 may be placed on two or more different sides of the joystick controller 630, e.g., on the front and on the back (as shown in phantom). Such placement allows the image capture unit 623 to obtain images of the light sources 634 for different orientations of the joystick controller 630 depending on how the joystick controller 630 is held by a user.

In addition the light sources 634 may provide telemetry signals to the processor 601, e.g., in pulse code, amplitude modulation or frequency modulation format. Such telemetry signals may indicate which joystick buttons are being pressed and/or how hard such buttons are being pressed. Telemetry signals may be encoded into the optical signal, e.g., by pulse coding, pulse width modulation, frequency modulation or light intensity (amplitude) modulation. The processor 601 may decode the telemetry signal from the optical signal and execute a game command in response to the decoded telemetry signal. Telemetry signals may be decoded from analysis of images of the joystick controller 630 obtained by the image capture unit 623. Alternatively, the apparatus 601 may include a separate optical sensor dedicated to receiving telemetry signals from the lights sources 634. The use of LEDs in conjunction with determining an intensity amount in interfacing with a computer program is described, e.g., in U.S. patent application Ser. No. 11/429,414, to Richard L. Marks et al., entitled "USE OF COMPUTER IMAGE AND AUDIO PROCESSING IN DETERMINING AN INTENSITY AMOUNT WHEN INTERFACING WITH A COMPUTER PROGRAM", filed May 4, 2006, which is incorporated herein by reference in its entirety. In addition, analysis of images containing the light sources 634 may be used for both telemetry and determining the position and/or orientation of the joystick controller 630. Such techniques may be implemented by instructions of the program 604 which may be stored in the memory 602 and executed by the processor 601.

The processor 601 may use the inertial signals from the inertial sensor 632 in conjunction with optical signals from light sources 634 detected by the image capture unit 623 and/or sound source location and characterization information from acoustic signals detected by the microphone array 622 to deduce information on the location and/or orientation of the controller 630 and/or its user. For example, "acoustic radar" sound source location and characterization may be used in conjunction with the microphone array 622 to track a moving voice while motion of the joystick controller is independently tracked (through the inertial sensor 632 and or light sources 634). In acoustic radar select a pre-calibrated listening zone is selected at runtime and sounds originating from sources outside the pre-calibrated listening zone are filtered out. The pre-calibrated listening zones may include a listening zone that corresponds to a volume of focus or field of view of the image capture unit 623. Examples of acoustic radar are described in detail in U.S. patent application Ser. No. 11/381,724, to Xiaodong Mao entitled "METHODS AND APPARATUS FOR TARGETED SOUND DETECTION AND CHARACTERIZATION", filed May 4, 2006, which is incorporated herein by reference. Any number of different combinations of different modes of providing control signals to the processor 601 may be used in conjunction with embodiments of the present invention. Such techniques may be implemented by program code instructions 604 which may be stored in the memory 602 and executed by the processor 601 and may optionally include one or more instructions that direct the one or more processors to select a pre-calibrated listening zone at run-time and filter out sounds originating from sources outside the pre-calibrated listening zone. The pre-calibrated listening zones may include a listening zone that corresponds to a volume of focus or field of view of the image capture unit 623.

The program 604 may optionally include one or more instructions that direct the one or more processors to produce a discrete time domain input signal $x_m(t)$ from microphones $M_0 \ldots M_M$, of the microphone array 622, determine a listening sector, and use the listening sector in a semi-blind source separation to select the finite impulse response filter coefficients to separate out different sound sources from input signal $x_m(t)$. The program 604 may also include instructions to apply one or more fractional delays to selected input signals $x_m(t)$ other than an input signal $x_0(t)$ from a reference microphone $M_0$. Each fractional delay may be selected to optimize a signal to noise ratio of a discrete time domain output signal y(t) from the microphone array. The fractional delays may be selected to such that a signal from the reference microphone $M_0$ is first in time relative to signals from the other microphone(s) of the array. The program 604 may also include instructions to introduce a fractional time delay Δ into an output signal y(t) of the microphone array so that: $y(t+\Delta)=x(t+\Delta)*b_0+x(t-1+\Delta)*b_1+x(t-2+\Delta)*b_2+ \ldots +x(t-N+\Delta)b_N$, where Δ is between zero and ±1. Examples of such techniques are described in detail in U.S. patent application Ser. No. 11/381,729, to Xiaodong Mao, entitled "ULTRA SMALL MICROPHONE ARRAY" filed May 4, 2006, the entire disclosures of which are incorporated by reference.

The program 604 may include one or more instructions which, when executed, cause the system 600 to select a pre-calibrated listening sector that contains a source of sound. Such instructions may cause the apparatus to determine whether a source of sound lies within an initial sector or on a particular side of the initial sector. If the source of sound does not lie within the default sector, the instructions may, when executed, select a different sector on the particular side of the default sector. The different sector may be characterized by an attenuation of the input signals that is closest to an optimum value. These instructions may, when executed, calculate an attenuation of input signals from the microphone array 622 and the attenuation to an optimum value. The instructions may, when executed, cause the apparatus 600 to determine a value of an attenuation of the input signals for one or more sectors and select a sector for which the attenuation is closest to an optimum value.

Examples of such a technique are described, e.g., in U.S. patent application Ser. No. 11/381,725, to Xiaodong Mao, entitled "METHODS AND APPARATUS FOR TARGETED SOUND DETECTION" filed May 4, 2006, the disclosures of which are incorporated herein by reference.

Signals from the inertial sensor 632 may provide part of a tracking information input and signals generated from the image capture unit 623 from tracking the one or more light sources 634 may provide another part of the tracking information input. By way of example, and without limitation, such "mixed mode" signals may be used in a football type video game in which a Quarterback pitches the ball to the right after a head fake head movement to the left. Specifically, a game player holding the controller 630 may turn his head to the left and make a sound while making a pitch movement swinging the controller out to the right like it was the football. The microphone array 620 in conjunction with "acoustic radar" program code can track the user's voice. The image capture unit 623 can track the motion of the user's head or track other commands that do not require sound or use of the controller. The sensor 632 may track the motion of the joystick controller (representing the football). The image capture unit 623 may also track the light sources 634 on the controller 630. The user may release of the "ball" upon reaching a certain amount and/or direction of acceleration of the joystick controller 630 or upon a key command triggered by pressing a button on the controller 630.

In certain embodiments of the present invention, an inertial signal, e.g., from an accelerometer or gyroscope may be used to determine a location of the controller 630. Specifically, an acceleration signal from an accelerometer may be integrated once with respect to time to determine a change in velocity and the velocity may be integrated with respect to time to determine a change in position. If values of the initial position and velocity at some time are known then the absolute position may be determined using these values and the changes in velocity and position. Although position determination using an inertial sensor may be made more quickly than using the image capture unit 623 and light sources 634 the inertial sensor 632 may be subject to a type of error known as "drift" in which errors that accumulate over time can lead to a discrepancy D between the position of the joystick 630 calculated from the inertial signal (shown in phantom) and the actual position of the joystick controller 630. Embodiments of the present invention allow a number of ways to deal with such errors.

For example, the drift may be cancelled out manually by re-setting the initial position of the controller 630 to be equal to the current calculated position. A user may use one or more of the buttons on the controller 630 to trigger a command to re-set the initial position. Alternatively, image-based drift may be implemented by re-setting the current position to a position determined from an image obtained from the image capture unit 623 as a reference. Such image-based drift compensation may be implemented manually, e.g., when the user triggers one or more of the buttons on the joystick controller 630. Alternatively, image-based drift compensation may be implemented automatically, e.g., at regular intervals of time or in response to game play. Such techniques may be implemented by program code instructions 604 which may be stored in the memory 602 and executed by the processor 601.

In certain embodiments it may be desirable to compensate for spurious data in the inertial sensor signal. For example the signal from the inertial sensor 632 may be oversampled and a sliding average may be computed from the oversampled signal to remove spurious data from the inertial sensor signal. In some situations it may be desirable to oversample the signal and reject a high and/or low value from some subset of data points and compute the sliding average from the remaining data points. Furthermore, other data sampling and manipulation techniques may be used to adjust the signal from the inertial sensor to remove or reduce the significance of spurious data. The choice of technique may depend on the nature of the signal, computations to be performed with the signal, the nature of game play or some combination of two or more of these. Such techniques may be implemented by instructions of the program 604 which may be stored in the memory 602 and executed by the processor 601.

The processor 601 may perform analysis of inertial signal data 606 as described above in response to the data 606 and program code instructions of a program 604 stored and retrieved by the memory 602 and executed by the processor module 601. Code portions of the program 604 may conform to any one of a number of different programming languages such as Assembly, C++, JAVA or a number of other languages. The processor module 601 forms a general-purpose computer that becomes a specific purpose computer when executing programs such as the program code 604. Although the program code 604 is described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both.

Figure 5B:
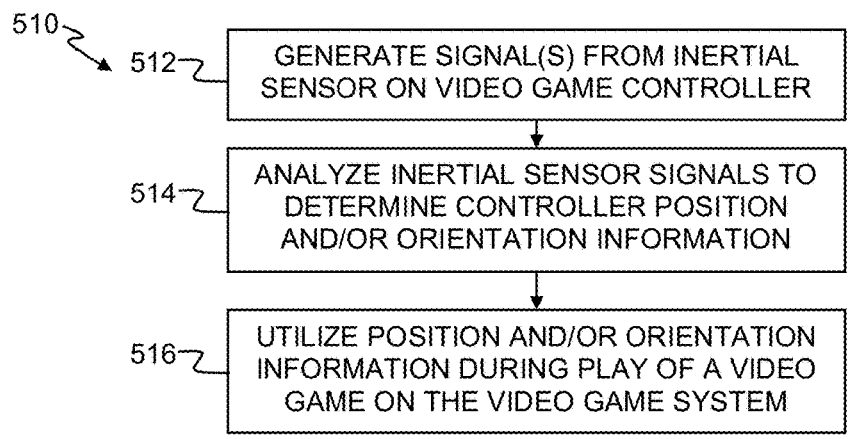
FIG. 5B is a flow diagram of a method for tracking a controller of a video game system according to an embodiment of the present invention.
Figure 5C:
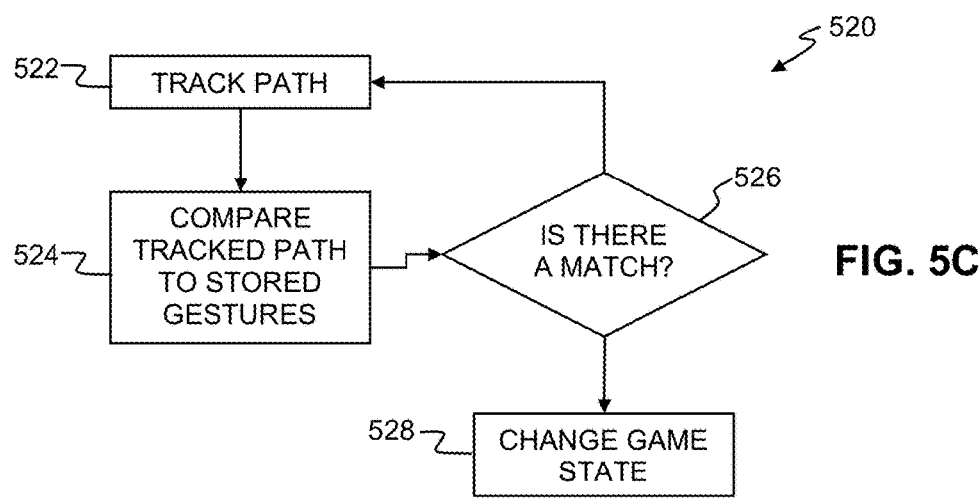
FIG. 5C is a flow diagram illustrating a method for utilizing position and/or orientation information during game play on a video game system according to an embodiment of the present invention.

In one embodiment, among others, the program code 604 may include a set of processor readable instructions that implement a method having features in common with the method 510 of FIG. 5B and the method 520 of FIG. 5C or some combination of two or more of these. The program code 604 may generally include one or more instructions that direct the one or more processors to analyze signals from the inertial sensor 632 to generate position and/or orientation information and utilize the information during play of a video game.

The program code 604 may optionally include processor executable instructions including one or more instructions which, when executed cause the image capture unit 623 to monitor a field of view in front of the image capture unit 623, identify one or more of the light sources 634 within the field of view, detect a change in light emitted from the light source(s) 634; and in response to detecting the change, triggering an input command to the processor 601. The use of LEDs in conjunction with an image capture device to trigger actions in a game controller is described e.g., in U.S. patent application Ser. No. 10/759,782 to Richard L. Marks, filed Jan. 16, 2004 and entitled: METHOD AND APPARATUS FOR LIGHT INPUT DEVICE, which is incorporated herein by reference in its entirety.

The program code 604 may optionally include processor executable instructions including one or more instructions which, when executed, use signals from the inertial sensor and signals generated from the image capture unit from tracking the one or more light sources as inputs to a game system, e.g., as described above. The program code 604 may optionally include processor executable instructions including one or more instructions which, when executed compensate for drift in the inertial sensor 632.

Although embodiments of the present invention are described in terms of examples related to a video game controller 630 games, embodiments of the invention, including the system 600 may be used on any user manipulated body, molded object, knob, structure, etc, with inertial sensing capability and inertial sensor signal transmission capability, wireless or otherwise.

By way of example, embodiments of the present invention may be implemented on parallel processing systems. Such parallel processing systems typically include two or more processor elements that are configured to execute parts of a program in parallel using separate processors. By way of example, and without limitation, FIG. 7 illustrates a type of cell processor 700 according to an embodiment of the present invention. The cell processor 700 may be used as the processor 601 of FIG. 6 or the processor 502 of FIG. 5A. In the example depicted in FIG. 7, the cell processor 700 includes a main memory 702, power processor element (PPE) 704, and a number of synergistic processor elements (SPEs) 706. In the example depicted in FIG. 7, the cell processor 700 includes a single PPE 704 and eight SPE 706. In such a configuration, seven of the SPE 706 may be used for parallel processing and one may be reserved as a back-up in case one of the other seven fails. A cell processor may alternatively include multiple groups of PPEs (PPE groups) and multiple groups of SPEs (SPE groups). In such a case, hardware resources can be shared between units within a group. However, the SPEs and PPEs must appear to software as independent elements. As such, embodiments of the present invention are not limited to use with the configuration shown in FIG. 7.

The main memory 702 typically includes both general-purpose and nonvolatile storage, as well as special-purpose hardware registers or arrays used for functions such as system configuration, data-transfer synchronization, memory-mapped I/O, and I/O subsystems. In embodiments of the present invention, a video game program 703 may be resident in main memory 702. The video program 703 may include an analyzer configured as described with respect to FIG. 5A, 5B or 5C above or some combination of these. The program 703 may run on the PPE. The program 703 may be divided up into multiple signal processing tasks that can be executed on the SPEs and/or PPE.

By way of example, the PPE 704 may be a 64-bit PowerPC Processor Unit (PPU) with associated caches L1 and L2. The PPE 704 is a general-purpose processing unit, which can access system management resources (such as the memory-protection tables, for example). Hardware resources may be mapped explicitly to a real address space as seen by the PPE. Therefore, the PPE can address any of these resources directly by using an appropriate effective address value. A primary function of the PPE 704 is the management and allocation of tasks for the SPEs 706 in the cell processor 700.

Although only a single PPE is shown in FIG. 7, some cell processor implementations, such as cell broadband engine architecture (CBEA), the cell processor 700 may have multiple PPEs organized into PPE groups, of which there may be more than one. These PPE groups may share access to the main memory 702. Furthermore the cell processor 700 may include two or more groups SPEs. The SPE groups may also share access to the main memory 702. Such configurations are within the scope of the present invention.

Each SPE 706 is includes a synergistic processor unit (SPU) and its own local storage area LS. The local storage LS may include one or more separate areas of memory storage, each one associated with a specific SPU. Each SPU may be configured to only execute instructions (including data load and data store operations) from within its own associated local storage domain. In such a configuration, data transfers between the local storage LS and elsewhere in the system 700 may be performed by issuing direct memory access (DMA) commands from the memory flow controller (MFC) to transfer data to or from the local storage domain (of the individual SPE). The SPUs are less complex computational units than the PPE 704 in that they do not perform any system management functions. The SPU generally have a single instruction, multiple data (SIMD) capability and typically process data and initiate any required data transfers (subject to access properties set up by the PPE) in order to perform their allocated tasks. The purpose of the SPU is to enable applications that require a higher computational unit density and can effectively use the provided instruction set. A significant number of SPEs in a system managed by the PPE 704 allow for cost-effective processing over a wide range of applications.

Each SPE 706 may include a dedicated memory flow controller (MFC) that includes an associated memory management unit that can hold and process memory-protection and access-permission information. The MFC provides the primary method for data transfer, protection, and synchronization between main storage of the cell processor and the local storage of an SPE. An MFC command describes the transfer to be performed. Commands for transferring data are sometimes referred to as MFC direct memory access (DMA) commands (or MFC DMA commands).

Each MFC may support multiple DMA transfers at the same time and can maintain and process multiple MFC commands. Each MFC DMA data transfer command request may involve both a local storage address (LSA) and an effective address (EA). The local storage address may directly address only the local storage area of its associated SPE. The effective address may have a more general application, e.g., it may be able to reference main storage, including all the SPE local storage areas, if they are aliased into the real address space.

To facilitate communication between the SPEs 706 and/or between the SPEs 706 and the PPE 704, the SPEs 706 and PPE 704 may include signal notification registers that are tied to signaling events. The PPE 704 and SPEs 706 may be coupled by a star topology in which the PPE 704 acts as a router to transmit messages to the SPEs 706. Alternatively, each SPE 706 and the PPE 704 may have a one-way signal notification register referred to as a mailbox. The mailbox can be used by an SPE 706 to host operating system (OS) synchronization.

The cell processor 700 may include an input/output (I/O) function 708 through which the cell processor 700 may interface with peripheral devices, such as a microphone array 712 and optional image capture unit 713 and a game controller 730. The game controller unit may include an inertial sensor 732, and light sources 734. In addition an Element Interconnect Bus 710 may connect the various components listed above. Each SPE and the PPE can access the bus 710 through a bus interface units BIU. The cell processor 700 may also includes two controllers typically found in a processor: a Memory Interface Controller MIC that controls the flow of data between the bus 710 and the main memory 702, and a Bus Interface Controller BIC, which controls the flow of data between the I/O 708 and the bus 710. Although the requirements for the MIC, BIC, BIUs and bus 710 may vary widely for different implementations, those of skill in the art will be familiar their functions and circuits for implementing them.

The cell processor 700 may also include an internal interrupt controller IIC. The IIC component manages the priority of the interrupts presented to the PPE. The IIC allows interrupts from the other components the cell processor 700 to be handled without using a main system interrupt controller. The IIC may be regarded as a second level controller. The main system interrupt controller may handle interrupts originating external to the cell processor.

In embodiments of the present invention, certain computations, such as the fractional delays described above, may be performed in parallel using the PPE 704 and/or one or more of the SPE 706. Each fractional delay calculation may be run as one or more separate tasks that different SPE 706 may take as they become available.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A game controller, comprising:
    an image capture unit;
    a body;
    at least one input device assembled with the body, the input device manipulable by a user to register an input from the user;
    an inertial sensor operable to produce information for quantifying a movement of said body through space;
    at least one light source assembled with the body;
    a processor coupled to the image capture unit and the inertial sensor, wherein the processor is configured to track the body by analyzing a signal from the inertial sensor and analyzing an image of the light source from the image capture unit; and
    wherein the processor is configured to establish a gearing between movement of the body and actions to be applied by a computer program, wherein one or more of the actions to be applied by the computer program includes generation of a noise, wherein changes in the gearing between the movement of the body and the generation of the noise vary a degree of response of the noise to the movement of the body during movement of the body as the noise is being generated, wherein the movement of the body is determined from inertial forces detected by the inertial sensor, or from analysis of the image from the image capture unit, or from both inertial forces detected by the inertial sensor and analysis of the image from the image capture unit, wherein the gearing changes during movement of the body.

2. The game controller as claimed in claim 1, further comprising a signal encoder and an infrared signal transmitter operable to transmit an infrared signal over the air using a signal from the signal encoder, the signal encoder being programmable to encode the signal with a selected one of a plurality of signaling codes for reception by an electronic device having an infrared receiver and a signal decoder operable with the selected one signaling code.

3. The game controller as claimed in claim 1, wherein the body includes a housing holdable by hand, and the input device includes an element movable by the user relative to the body of the game controller to register the input from the user.

4. The game controller as claimed in claim 3, wherein the housing includes a handgrip graspable by hand.

5. The game controller as claimed in claim 1, wherein the body of the game controller is mountable to the user's body.

6. The game controller as claimed in claim 1, wherein said inertial sensor is operable to produce information for quantifying a first component of said movement of the body along a first axis.

7. The game controller as claimed in claim 6, wherein said inertial sensor is operable to produce information for quantifying a second component of said movement along a second axis orthogonal to said first axis.

8. The game controller as claimed in claim 7, wherein said inertial sensor is operable to produce information for quantifying a third component of said movement along a third axis orthogonal to said first and second axes.

9. The game controller as claimed in claim 6, wherein said inertial sensor includes at least one accelerometer.

10. The game controller as claimed in claim 6, wherein said inertial sensor includes at least one mechanical gyroscope.

11. The game controller as claimed in claim 10, wherein said inertial sensor includes at least one laser gyroscope.

12. The game controller as claimed in claim 1, wherein said inertial sensor is operable to produce information for quantifying the movement of the body in at least three degrees of freedom.

13. The game controller as claimed in claim 12, wherein the three degrees of freedom include pitch, yaw and roll.

14. The game controller as claimed in claim 13, wherein the three degrees of freedom include an x-axis, a y-axis, and a z-axis, each of said x-axis, y-axis and said z-axis being orthogonal with respect to each other of said to said x-axis, a y-axis, and z-axis.

15. The game controller as claimed in claim 14, wherein said inertial sensor is operable to quantify the movement in six degrees of freedom, said six degrees of freedom including said three degrees of freedom and pitch, yaw and roll.

16. The game controller as claimed in claim 6, the game controller being further operable to obtain a series of samples representative of acceleration of said body along at least one axis at different points in time from the information produced by the inertial sensor.

17. The game controller as claimed in claim 16, further comprising a processor operable to determine a velocity of said body using said series of samples.

18. The game controller as claimed in claim 17, wherein the processor is operable to determine said velocity by integrating acceleration values obtained from said series of samples over an interval of time.

19. The game controller as claimed in claim 16, wherein the processor is operable to determine a displacement of said body in space by first integrating acceleration values obtained from said series of samples over an interval of time and then integrating a result of said first integrating over the interval of time.

20. The game controller as claimed in claim 19, wherein the processor is operable to determine the displacement in relation to a prior-determined position to determine a present position of the body in space.

21. An apparatus including the game controller as claimed in claim 16, the apparatus further comprising:
   a. a processor operable to execute a program to provide an interactive game playable by the user in accordance with input through said user-manipulable input device, the processor being operable to determine a velocity of said body using said series of samples.

22. The apparatus as claimed in claim 21, wherein the processor is operable to determine said velocity by integrating acceleration values obtained from said series of samples over an interval of time.

23. The apparatus as claimed in claim 21, wherein the processor is operable to determine a displacement of said body in space by first integrating acceleration values obtained from said series of samples over an interval of time and then integrating a result of said first integrating.

24. The apparatus as claimed in claim 21, wherein the processor is operable to determine a position of the body in space by determining the displacement in relation to a previously determined position.

25. The game controller as claimed in claim 1 wherein gearing means controls a multidimensional gearing amount and modifies each dimension of a multidimensional movement vector according to a corresponding dimension of the gearing amount.

26. The game controller as claimed in claim 1 wherein the changes in the gearing depend on a particular time interval during an action event occurring in the course of execution of the program.

27. The game controller of claim 1, further comprising logic for detecting a change in the light source; and logic for triggering a mode change command at a main program run through a computing device, in response to a detected change in the light source as caused by a press in the button of the hand held input object, the mode change triggering an action for interfacing with one or more objects illustrated on the display screen.

28. The game controller of claim 1, wherein the gearing changes as a result of movement of the body.

29. The game controller of claim 1, further comprising a diffuser assembled with the body proximate the light source, wherein the diffuser is configured to diffuse light from the light source, wherein the image capture unit is separate from the body.

30. The game controller of claim 29, wherein analyzing the image of the light source includes determining a centroid of a diffuse image of the light source that has been diffused by the diffuser and tracking the centroid.

31. A game controller, comprising:
   an image capture unit;
   a body;
   at least one input device assembled with the body, the input device manipulable by a user to register an input from the user;
   an inertial sensor operable to produce information for quantifying a movement of said body through space;
   at least one light source assembled with the body;
   a processor coupled to the image capture unit and the inertial sensor, wherein the processor is configured to track the body by analyzing a signal from the inertial sensor and analyzing an image of the light source from the image capture unit; and
   wherein the processor is configured to establish a gearing between movement of the body and actions to be applied by a computer program, wherein the movement of the body is determined from inertial forces detected by the inertial sensor, or from analysis of the image from the image capture unit, or from both inertial forces detected by the inertial sensor and analysis of the image from the image capture unit, wherein the gearing changes during interactivity with a virtual object of the computer program to impart a different response by the virtual object to the movement of the body during execution of actions to be applied by the computer program, wherein the changes in the gearing include different pre-determined gearing amounts between the movement of the body and the response of the virtual object during a single movement of the body, the single movement having a plurality of distinct pre-determined time periods, each of the different pre-determined gearing amounts being respectively mapped to each of the distinct pre-determined time periods of the single movement of the body.

32. The game controller of claim 31, wherein the pre-determined gearing amounts and the corresponding pre-determined time intervals are determined by user input to the computer program before the single movement.

33. The game controller of claim 31, wherein the pre-determined gearing amounts and the corresponding pre-determined time intervals are determined by the computer program before the single movement.

34. The game controller of claim 31, further comprising a diffuser assembled with the body proximate the light source, wherein the diffuser is configured to diffuse light from the light source, wherein the image capture unit is separate from the body.

35. The game controller of claim 34, wherein analyzing the image of the light source includes determining a centroid of a diffuse image of the light source that has been diffused by the diffuser and tracking the centroid.

* * * * *